(12) United States Patent
Andrews et al.

(10) Patent No.: US 8,539,399 B1
(45) Date of Patent: Sep. 17, 2013

(54) METHOD AND APPARATUS FOR PROVIDING USER-DEFINED INTERFACES FOR A CONFIGURABLE PROCESSOR

(75) Inventors: Nupur B. Andrews, Sunnyvale, CA (US); James Kim, San Jose, CA (US); Himanshu A. Sanghavi, Fremont, CA (US); William A. Huffman, Los Gatos, CA (US); Eileen Margaret Peters Long, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1817 days.

(21) Appl. No.: 11/829,063

(22) Filed: Jul. 26, 2007

Related U.S. Application Data

(62) Division of application No. 11/039,757, filed on Jan. 19, 2005, now Pat. No. 7,664,928.

(51) Int. Cl.
*G06F 17/50* (2006.01)

(52) U.S. Cl.
USPC .......................................... 716/104

(58) Field of Classification Search
USPC ......................... 716/100–102, 138
See application file for complete search history.

(56) References Cited

U.S. PATENT DOCUMENTS

| | | | |
|---|---|---|---|
| 5,452,426 A | 9/1995 | Papworth et al. | |
| 5,584,009 A | 12/1996 | Garibay et al. | |
| 5,909,566 A | 6/1999 | Cai et al. | |
| 6,282,633 B1 | 8/2001 | Killian et al. | |
| 6,477,683 B1 | 11/2002 | Killian et al. | |
| 6,477,684 B1 | 11/2002 | Sanghani et al. | |
| 6,477,697 B1 | 11/2002 | Killian et al. | |
| 6,763,327 B1 * | 7/2004 | Songer et al. | 703/21 |
| 7,020,854 B2 * | 3/2006 | Killian et al. | 716/102 |
| 7,036,106 B1 * | 4/2006 | Wang et al. | 716/104 |
| 7,216,202 B1 | 5/2007 | Chaudhry et al. | |
| 7,627,784 B1 * | 12/2009 | Allen et al. | 714/30 |
| 7,904,850 B2 * | 3/2011 | Spackman et al. | 717/136 |
| 2002/0083297 A1 * | 6/2002 | Modelski et al. | 712/18 |
| 2002/0133784 A1 * | 9/2002 | Gupta et al. | 716/1 |
| 2002/0199066 A1 | 12/2002 | Chaudhry et al. | |

(Continued)

OTHER PUBLICATIONS

Hennessy, et al., "Computer Architecture a Quantitative Approach", Third Ed., Morgan Kaufman Publishers, May 15, 2002, pertinent pp. 220-259.

(Continued)

*Primary Examiner* — Binh Tat
(74) *Attorney, Agent, or Firm* — Sawyer Law Group, P.C.

(57) ABSTRACT

A technique that improves both processor performance and associated data bandwidth through user-defined interfaces that can be added to a configurable and extensible microprocessor core. These interfaces can be used to communicate status or control information and to achieve synchronization between the processor and any external device including other processors. These interfaces can also be used to achieve data transfer at the rate of one data element per interface in every clock cycle. This technique makes it possible to design multiprocessor SOC systems with high-speed data transfer between processors without using the memory subsystem. Such a system and design methodology offers a complete shift from the standard bus-based architecture and allows designers to treat processors more like true computational units, so that designers can more effectively utilize programmable solutions rather than design dedicated hardware. This can have dramatic effects not only in the performance and bandwidth achieved by designs, but also in the time to market and reuse of such designs.

72 Claims, 14 Drawing Sheets

(56) References Cited

U.S. PATENT DOCUMENTS

2003/0208723 A1* 11/2003 Killian et al. ............... 716/1
2004/0162948 A1    8/2004 Tremblay et al.
2004/0250231 A1* 12/2004 Killian et al. ............. 716/18
2005/0050305 A1*  3/2005 Kissell ..................... 712/220

OTHER PUBLICATIONS

Ben A. Abderazek, "Produced Order Parallel Queue Processor Architecture Design Manual, Version 1.0," Graduate School of Information Systems, Sowa Laboratory, The University of Electro-communications, p. 1-15, (Oct. 30, 2002).

Marco Annaratone et al., "The Warp Computer: Architecture, Implementation, and Performance," Dept. of Computer Science, The Robotics Inst., Carnegie Mellon University (Pittsburgh, PA), p. i-25, (Jul. 1987).

John Catsoulis, "Transputers—Extinct But Not Forgotten," Embedded Pty Ltd. http://www.embedded.com.au/reference/transputers.html), p. 1-15, (Oct. 2004).

* cited by examiner

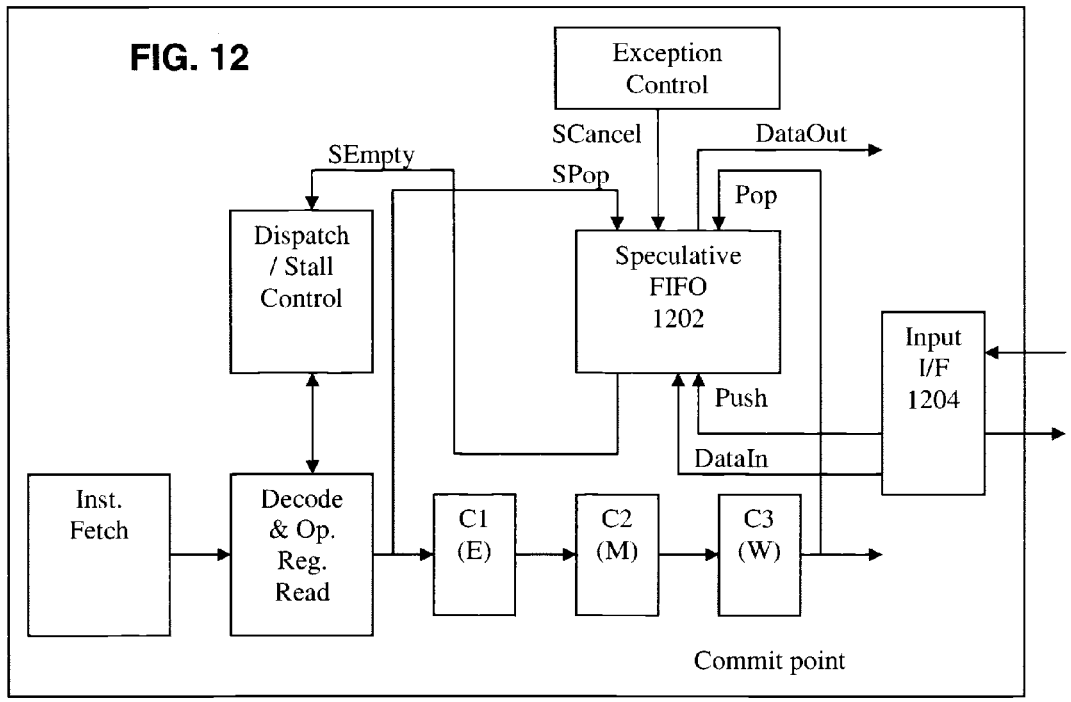
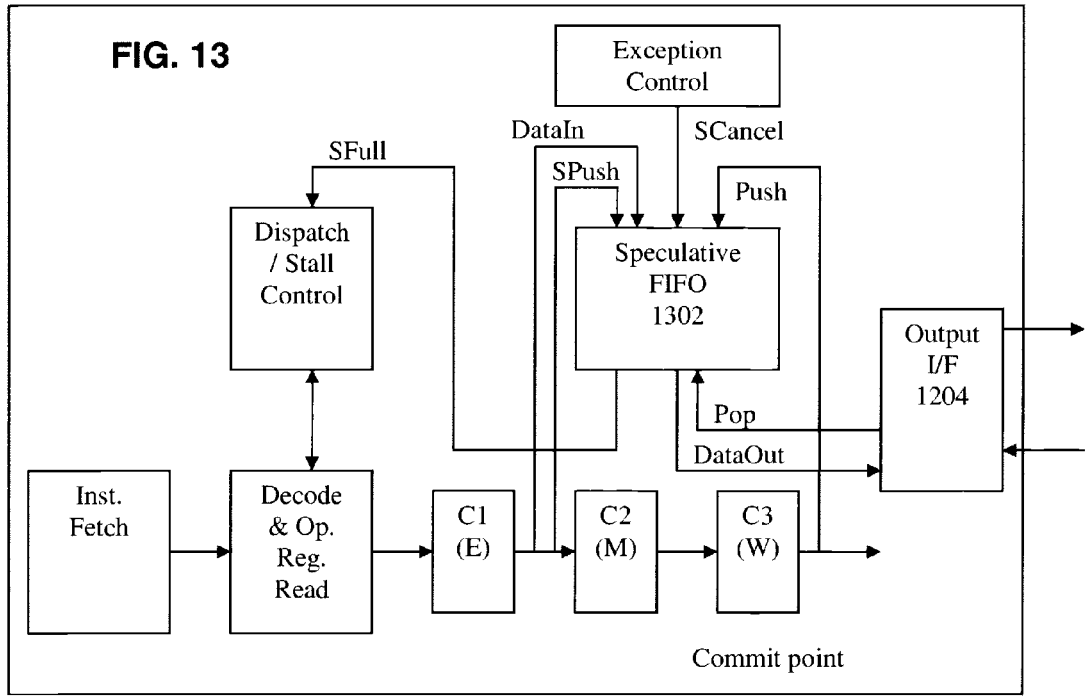

FIG. 29
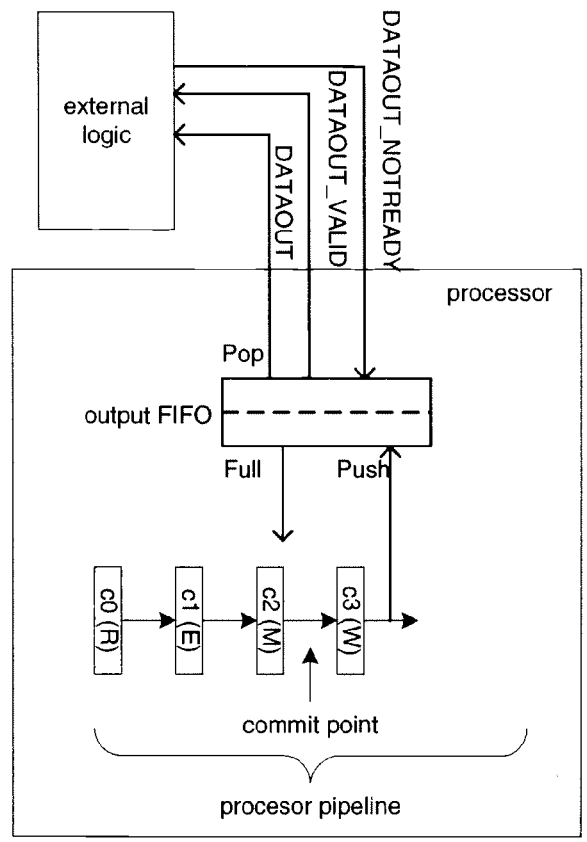
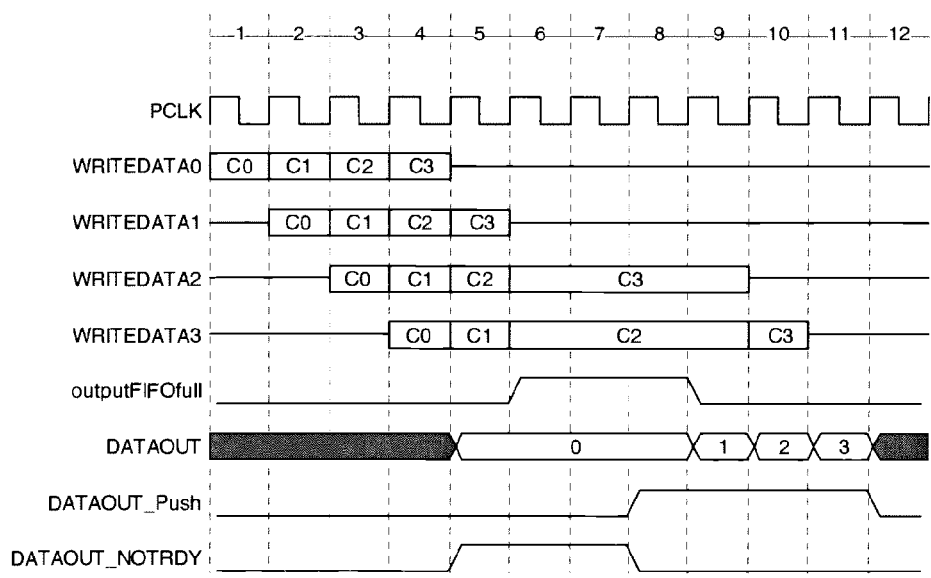
FIG. 30

FIG. 31
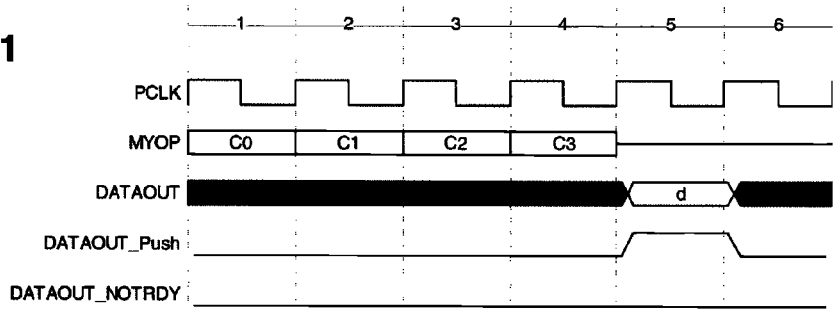
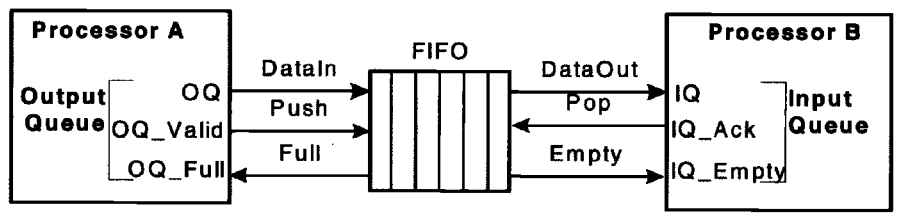
FIG. 32
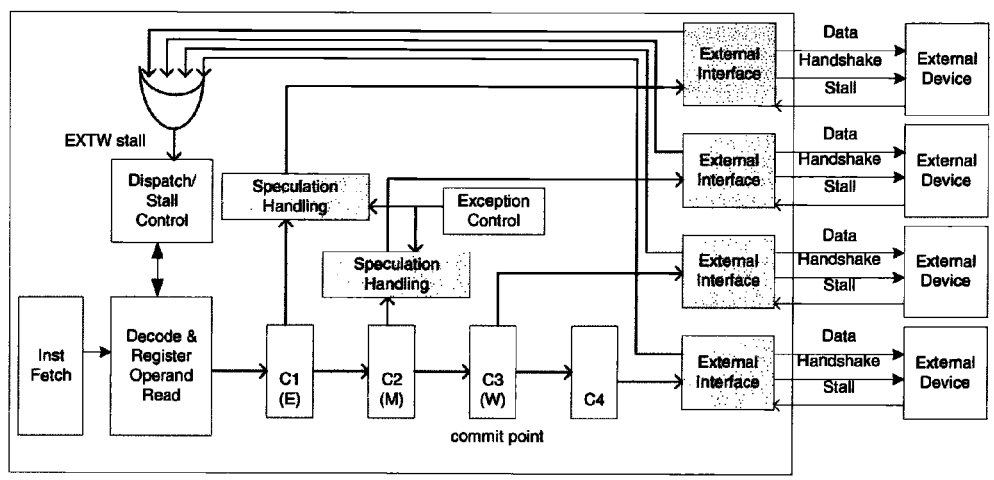
FIG. 33

METHOD AND APPARATUS FOR PROVIDING USER-DEFINED INTERFACES FOR A CONFIGURABLE PROCESSOR

CROSS REFERENCE TO RELATED APPLICATIONS

This application is a divisional of U.S. application Ser. No. 11/039,757 filed on Jan. 19, 2005 now U.S. Pat. No. 7,664, 928, entitled "Method and Apparatus for Providing User-Defined Interfaces for a Configurable Processor", the contents of which are incorporated herein by reference.

FIELD OF THE INVENTION

The present invention relates generally to processors, and in particular to operating on data from external interfaces in a configurable processor.

BACKGROUND OF THE INVENTION

Specialized integrated circuit designs are becoming more and more popular for a variety of applications, such as multimedia, networking and wireless communications. Such designs typically require one or more processors in the implementation of high performance embedded applications. Such designs also have aggressive design goals for performance, power and cost. Meanwhile, the high development cost and time to market considerations require a flexible, programmable platform for their implementation. These types of applications have inherent parallelism at many levels of granularity that can be exploited by identifying a set of tasks that can run concurrently on multiple processors. Thus, these applications are typically mapped to system-on-a-chip (SOC) architectures consisting of a heterogeneous mix of programmable processors and application specific subsystems.

Although such new architectures can achieve very high performance in terms of speed, the overall performance of applications still suffers from the limited speed of data input/output (I/O) operations. This is especially important in a multiprocessor SOC system where the application is partitioned to run on several processors, which need to move a lot of data from one to another, in addition to in and out of the individual processors. The standard methods of moving data in and out of standard processors require multiple steps such as:

1. DMA controllers move data from a device into processor memory.
2. The processor consumes multiple instructions to setup a memory access that brings the data from processor memory into a register.
3. Some computation is performed on register operands.
4. The resulting products are flushed from a register back out to processor memory.
5. DMA controllers move data from processor memory out to a device.

To avoid the memory bottleneck imposed by standard I/O methods, some designers may choose to implement most of their SOC functionality in custom RTL logic instead of on a programmable processor. This approach has its own drawbacks in that it inflexibly binds the custom design to a single application, requires a lengthy and arduous design cycle, and is quickly becoming prohibitively expensive. Various other strategies such as data pre-fetching, faster on-chip memories, multi-level cache hierarchies, and wider interfaces to memory have been applied to bridge the gap between processor and memory performance. But these approaches fail to satisfy the prodigious appetites of emerging embedded applications. Moreover, they may provide an ineffective tradeoff of performance for area and power in embedded applications, which often lack the pattern and locality of data references for which these methods were developed.

Worse yet, the advent of application specific processors in recent years has further widened the gap between processor speed and bandwidth, since processors customized to particular applications with special extensions are able to achieve huge performance improvements over general-purpose processors. Configurable and extensible processors such as the Xtensa processor from Tensilica, Inc. of Santa Clara, Calif., for example, lie between general-purpose processors and custom circuits. They allow the designer to enhance computational performance by adding custom data-path execution units, often very wide. Moreover, extension capabilities allow designers to add new instructions to the base processor that read and write their operands from a register file, either a customized register file added by the extension, or the existing register file in the base processor. However, data transfer to and from the execution units is still dependent upon the memory interface of the base processor. This can offset the performance gain in many applications, especially those involving high data bandwidth requirements such as networking or video.

Other processor architectures have also been developed that propose various alternative approaches to the conventional memory interface. One example is the ARC architecture from ARC International of San Jose, Calif. See, for example, www.arc.com.

The ARC architecture is a configurable processor architecture like the Xtensa. It provides two methods of interfacing to the processor besides the usual method of doing loads from and stores to memory on a dedicated processor memory interface. These are extension core registers and auxiliary registers which do not contend with data moving over the main memory bus. The extension registers can be directly accessed by peripheral logic, enabling such devices to communicate with the processor. The auxiliary registers allows 32 bit memory mapped access to registers and memory in an independent address space.

There are several shortcomings of the ARC architecture. The number and width of the extension and auxiliary registers is fixed. There is no handling of speculative reads or writes, or any option of reading/writing in a variable pipeline stage.

Another example architecture is the iWarp architecture, as described in, for example, S. Borkar et. al., "iWarp: An Integrated Solution to High-Speed Parallel Computing", Supercomputing '88. iWarp is a product of a joint effort between Carnegie Mellon University and Intel Corporation. The goal of the effort was to develop a powerful building block for various distributed memory parallel computing systems.

iWarp supports both systolic and message passing models of communication. In the systolic model of communication, the source cell program sends data items to the destination cell as it generates them, and the destination cell program can start processing the data as soon as the first word of input has arrived. In the message passing mode of communication, the communication agent puts a message in the local memory for the computation agent to read it, and takes data from the local memory to send it as a message to another processor. An iWarp system may also use FIFO queuing along the communication path between two iWarp cells.

There are several shortcomings in the iWarp architecture. The communication link is only between two iWarp processors and is fixed (i.e. not "user defined" or configurable) Further, the number and width of the channels is fixed. There is no handling of speculative reads or writes, or any option of reading/writing in a variable pipeline stage.

Another example processor architecture is the Transputer (see, for example, www.classiccmp.org/transputer/main_page.html) Transputers are high performance microprocessors developed by Inmos Ltd. (now ST Microelectronics <http://www.st.com>) that support parallel processing through on-chip hardware.

Transputer microprocessors can be connected together by their serial links in application-specific ways and can be used as the building blocks for complex parallel processing systems. Four high speed links allow transputers to be connected to each other in arrays, trees and many other configurations. The communication links between processors operate concurrently with the processing unit and can transfer data simultaneously on all links without the intervention of the CPU.

The Transputer architecture has several shortcomings with respect to data interfaces. The transputer interfaces provided a fixed link between two transputers, not a link from a processor (i.e. one transputer) to any external logic. Further the link consists of a fixed set of 4 serial interfaces, and the interfaces are not configurable in either width or number. There is no handling of speculative reads or writes, or any option of reading/writing in a variable pipeline stage.

Another alternative architecture is the IXP Network Processor architecture from Intel Corp. of Santa Clara, Calif. This architecture includes a number of microengines (which are basically RISC processors) with a dedicated dataflow link. Each microengine can write to the next one's register set, and these registers can be configured as a ring, where each microengine pushes data into it and the next pops data from it. These next neighbor registers can be read or written as operands to the regular ISA of the microengine (ME).

Although this architecture has certain advantages, the overall interface methodology is narrowly limited. For example, the next neighbor registers can connect only to another similar processor having the IXP architecture. Further, the number and width of these registers is predetermined and fixed. There is no handling of speculative reads or writes, or any option of reading/writing in a variable pipeline stage.

A final alternative example is the Queue Processor architecture. Specifically, the University of Electro-Communications, Japan, has proposed a produced order parallel queue processor architecture. To store intermediate results, the proposed system uses FIFO queue registers instead of random access registers. Datum is inserted in the queue in produced order scheme and can be reused.

Queue processors have nothing to do with interfacing a processor to external logic or to external queues. They use a queue (or a FIFO) instead of a register file inside the processor to store the input and output operands of instructions.

In summary, while other conventional proposals have sent data into and out of a processor without using the load/store unit, there are key shortcomings in all of them. They either have a fixed, dedicated link to another processor of the same architecture, or an address mapped interface to external logic. It would be preferable if the data could be calculated and written to the interface, or read from the interface and used in a calculation, all in one cycle. It would be further preferable if the number of interfaces could be configurable and the width of each interface could be independently configurable. It would be still further preferable if the pipeline stage when the interfaces are read or written could be configurable. Another important shortcoming is that in many of the prior art processors the new interfaces are connected to a similar processor, which is not a desirable restriction in many cases. And finally, it would be tremendously valuable if hardware and software models containing such novel interfaces could be created automatically.

SUMMARY OF THE INVENTION

The present invention provides a technique for improving both processor performance and associated data bandwidth through user-defined interfaces that can be added to a configurable and extensible microprocessor core. These interfaces can be used to communicate status or control information, can achieve data transfer at the rate of one data element every processor clock per interface, and can be used to achieve synchronization between the processor and any external device including other processors. This technique makes it possible to design multiprocessor SOC systems with high-speed data transfer between processors without using the memory subsystem.

The system and design methodology of the present invention offers a complete shift from the standard bus-based architecture and allows designers to treat processors more like true computational units, so that designers can more effectively utilize programmable solutions rather than design dedicated hardware. This can have dramatic effects not only in the performance and bandwidth achieved by designs, but also in the time to market and reuse of such designs.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 12 is a block diagram of how speculative buffering can be employed in a processor having a user-defined input interface according to the invention;

FIG. 13 is a block diagram of how speculative buffering can be employed in a processor having a user-defined output interface according to the invention;

FIGS. 23-31 are block diagrams and timing diagrams illustrating example user-defined output interfaces that can be designed according to the invention;

FIG. 32 is a block diagram illustrating an example of how user-defined interfaces according to the invention can be used to implement inter-processor queues;

FIG. 33 is a block diagram illustrating an example synchronization scheme for user-defined interfaces according to the invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known and unknown equivalents to the known components referred to herein by way of illustration.

Generally, the present invention provides the ability to design a processor that can read and write data and control information from and to external agents (e.g. other on-chip logic, processors, programmable logic (FPGA) or data structures such as memory and FIFO's and other devices) through user-defined interfaces, rather than through memory, in substantially the same programmer visible way as the processor reads and writes data from and to local registers and states. According to one aspect of the invention, the user-defined interfaces are described as extensions to a baseline processor ISA through a processor extension language. According to a further aspect, customized processor instructions can then be added to the baseline ISA to operate on these interfaces as if they were ordinary register operands.

Although the present invention finds particularly useful application for, and will be described in detail with reference to, designing a processor core for an ASIC or SOC, the principles of the invention are not necessarily so limited, and those skilled in the art will be able to extend the principles of the invention to other applications such as general-purpose microprocessors.

Figure 1:
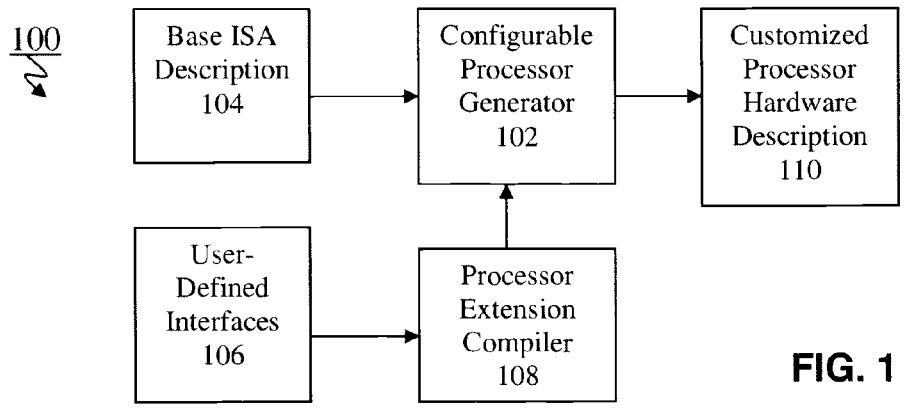
FIG. 1 is a block diagram of a system for designing a processor having user-defined interfaces in accordance with the invention.

FIG. 1 is a block diagram illustrating a system for generating a processor having user-defined interfaces in accordance with the principles of the invention.

As shown in FIG. 1, a system 100 for generating a hardware description of a customized processor 110 includes a configurable processor generator 102 that receives a base ISA description 104 and a specification of processor extensions from extension compiler 108, which processor extensions may include a specification of user-defined interfaces 106.

System 100 is, for example, a computer (e.g. a Pentium-4 class computer operated by a Windows operating system) loaded with software that receives user inputs and causes them to be supplied to the software components of the system. System 100 also provides means for accessing certain necessary blocks (e.g. base ISA description 104) from memory or via a network. In one example, system 100 includes software for providing a configurable processor development environment such as Xtensa Xplorer software from Tensilica, Inc. of Santa Clara, Calif. that has been modified and extended to support the user-defined interface features of the present invention. It should be noted that system 100 can be implemented using one or many computers and computer components.

Base ISA description 104 is preferably a description (e.g. a base set of Verilog files and Perl scripts) of an extensible and configurable processor core architecture, such as that described in U.S. Pat. Nos. 6,282,633 and 6,477,683, and/or the Xtensa 32-bit configurable RISC core from Tensilica, Inc. of Santa Clara, Calif. The Xtensa base architecture has a 32-bit ALU, up to 64 general-purpose registers, 6 special purpose registers and 80 base instructions, including 16- and 24-bit RISC instruction encoding for high code density and efficient power dissipation. However, the invention is applicable to other types of processor core architectures such as those from ARM, MIPS, ARC, CoWare, CEVA, and the like.

Configurable processor generator 102 is, for example, a processor generator such as that described in U.S. Pat. Nos. 6,477,684 and 6,477,697 and/or an Xtensa processor generator from Tensilica, Inc. of Santa Clara, Calif. that has been adapted and modified for use with the present invention. In a preferred embodiment, the Xtensa processor generator interoperates with a web-based interface that allows a designer or developer to select instruction set options, memory hierarchy, closely-coupled building blocks and external interfaces required by a particular application. The Xtensa processor generator further allows quick processor configuration of the base ISA core, including the number and bit-widths of multipliers, the number and type of DSP engines, and whether to include a floating point unit. As will be explained more fully below, the processor generator 102 of the present invention further generates a description of instructions and execution units associated with user-defined interfaces.

Processor extension compiler 108 provides a set of descriptions of additional hardware and customized processor instructions to include in the processor. In one example of the invention, compiler 108 incorporates the technology of U.S. Pat. No. 6,477,697 and/or the Tensilica Instruction Extension (TIE) language and compiler from Tensilica, Inc. of Santa Clara, Inc., as modified and adapted to accept specifications of user-defined interfaces 106 in accordance with the principles of the invention. In this example, the TIE compiler generates TIE files for use by the Xtensa processor generator based on user-defined extensions specified in the TIE language. It should be apparent, however, that the principles of the invention are not to be limited to these specific examples, and that the invention can include other types of similar or equivalent processor generation systems, extension languages and compilers, and processor architectures.

Customized processor hardware description 110 is preferably a complete synthesizable hardware design of a processor (e.g. synthesizable RTL).

Figure 2:
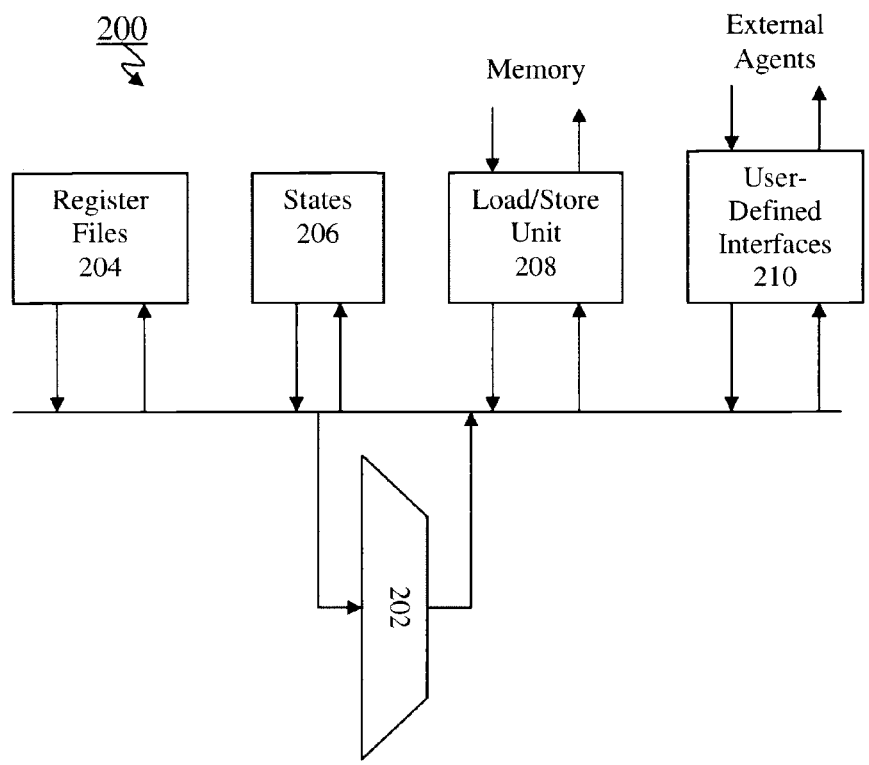
FIG. 2 is a block diagram of a processor having user-defined interfaces that can be designed using the system of FIG. 1.

FIG. 2 is a block diagram of a processor corresponding to a hardware description generated using a system such as that illustrated in FIG. 1.

As shown in FIG. 2, a processor 200 in accordance with the present invention includes a computation unit 202 that receives inputs from and provides outputs to register files 204, states 206, load/store unit 208 and user-defined interfaces 210.

As with conventional processors, load/store unit 208 enables instructions executed by computation unit 202 to read and write data from and to memory. However, the traditional load-computation-store execution flow of programs can have poor performance due to the overhead cycles required to compute addresses and load and store data from memory.

The processor according to the invention therefore further enables computation unit 202 to read and write data and control information directly from and to external agents. This allows certain operations that would otherwise require a traditional load-computation-store flow to be replaced with single cycle operations that read or write the user defined interfaces associated with the external agents directly, thereby avoiding the overhead penalty of performing loads and stores.

External agents can include other on-chip logic, processors, programmable logic (FPGA) or data structures such as FIFO's, memories and memory controllers or arbiters, serial controllers, interrupt controllers and other devices such as UART/USB devices.

As set forth above, in a preferred embodiment of the invention, user-defined interfaces are included in a processor description at the option of a designer through use of the Tensilica TIE language and compiler. Various aspects of the invention will now be described in connection with this preferred embodiment, and those skilled in the art will be able to understand how to apply the principles of the invention to other processor design environments such as FPGA from these descriptions.

Generally, as will be set forth in more detail below, an extension language (e.g. the TIE language as adapted in accordance with the invention) allows a designer to specify any number of user-defined interfaces to be instantiated in a processor description. The extension compiler (e.g. the TIE compiler likewise adapted in accordance with the invention) automatically generates the implementation of the new interfaces, seamlessly integrating them with the base processor. Preferably, the interfaces are configurable not only in number and width, but also in other ways that will become apparent from the following descriptions. Those skilled in the art will appreciate, however, that although the number of such I/O interfaces, and corresponding bandwidth, is theoretically unbounded, the actual number in practice will typically be limited by physical design considerations for a particular application.

One example syntax of describing a user-defined interface using the extension language in accordance with the present invention is shown below:

interface <name> <width> <dir>

Where <name>, <width> and <dir> are parameters supplied by the designer, with the <dir> parameter specifying whether the interface is an input (in) or an output (out) interface. From such a description specified by a designer, the extension compiler and processor generator instantiate corresponding structure in the processor hardware description.

Figure 3:
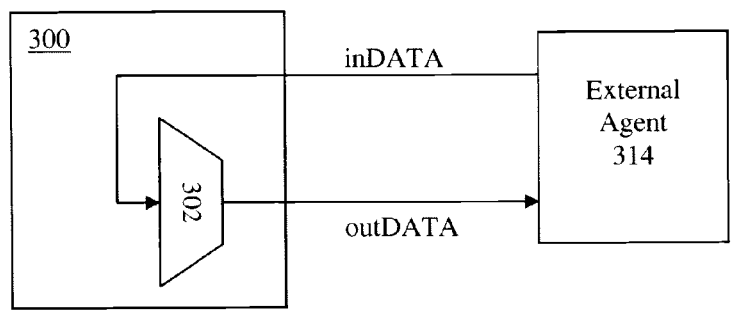
FIGS. 3-10 are block diagrams of various examples of user-defined interfaces that can be configured for a processor in accordance with the invention.

FIG. 3 illustrates a processor 300 including a user-defined inDATA input interface from external agent 314 of arbitrary bit-width, and a user-defined outDATA output interface to external agent 314 of arbitrary bit-width. In one embodiment of the invention, the processor 300 has five pipeline stages: instruction fetch (I), decode and register read (R), execute (E), memory access (M) and writeback (W). The write back stage (W) is also referred to as the commit stage in conjunction with this example of the invention. More particularly, the commit stage is the stage when the instruction is guaranteed to complete. Interrupts, exceptions, or other changes in control flow cannot kill an instruction beyond the commit stage. The instruction may take more cycles to complete the computation and write it results in a stage later than W. In the description of the user-defined interface, a numbering convention of 0-3 is followed for stages R-W, respectively. In one example of the invention, input interfaces specified by the extension language are by default available in the execution (E) stage of the pipeline. Output interfaces specified by the extension language are by default written in the write back (W) stage of the pipeline, after the instruction writing the output has committed in the pipeline. Although only one external agent 314 is shown in FIG. 3, this is not a limitation and it is possible that the two interfaces are communicating with different agents. Moreover, it is not necessary for there to be a like number of input and output interfaces.

According to a further aspect of the invention, the designer can also add instructions to the processor, using the extension language, to read or write a user-defined input or output interface, respectively. In a preferred embodiment of the invention, an example syntax for specifying an instruction definition that reads or writes a user-defined interface is as follows:

```
operation <name> {<operand declarations>}
{<interface declarations>, <state declaration>}
{
assign <output operand>=<input interface>;
assign <output interface>= ... ;
}
```

The "operation" or instruction statement describes an instruction in the extension language, with the instruction having the name specified by the <name> parameter. The <operand declarations" list defines all the register and immediate operands that the instruction reads and writes. The <interface declarations> and <state declarations> lists are optional and specify the implicit operands that are not directly encoded into the instruction, such as user-defined processor state and interfaces. These lists consist of a direction and the name of the operand, state or interface. Preferably, these interfaces are also operands of the instruction but they are implicit operands, i.e. they are not encoded in the instruction itself and therefore appear in the second list. The body of the operation defines the data-path of the instruction. The user-defined interfaces are treated like register operands or state operands when describing the data-path. Input operands, states and interfaces can appear in the right hand side of an assignment and output operands, states and interfaces can be assigned to.

The following example describes adding to a customized processor, using the extension language, a 40-bit input interface, a 32-bit output interface, and an instruction that reads data from the input interface, performs some computation, and writes the result to an output interface. The computation performed is shown as

```
interface MSG 40 in
interface DATA 32 out
operation MSGGET {in MSG, out DATA}
{wire [31:0] data=MSG[31:0];
wire [7:0] header=MSG[39:32];
wire [31:0] result=data+{24{header[7]},header};
assign DATA=result;
}
```

In this example, the extension compiler and processor generator according to the invention instantiate the necessary hardware descriptions to implement the interfaces in the processor, and also add the new MSGGET instruction to the instruction set of the processor. The new MSGGET instruction is executable in one execution cycle of the processor and operates on the user-defined interfaces MSG and DATA as ordinary instruction operands.

This embodiment of the invention includes several alternatives and extensions to the configuration and specification of user-defined interfaces, certain of which will be described in more detail herein below, which can be practiced alone or in combination together. Moreover, certain or all of the below alternatives and extensions can be automatically included or required to be configured in various combinations, rather than optionally included as described below.

Figure 4:
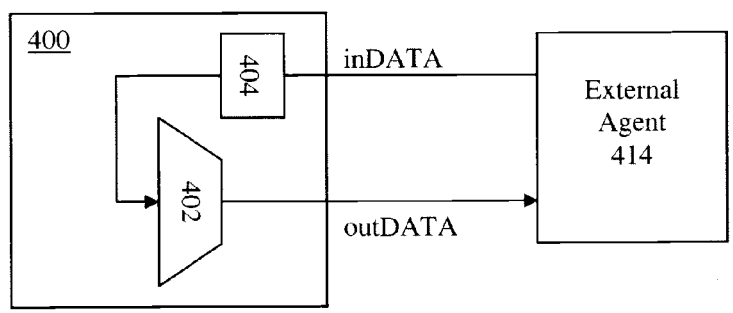

In connection with FIG. 4, the extension language and compiler of the invention further provide the ability to optionally register an interface. This specifies the timing of the user-defined interface at the processor level. An input interface that is configured to be registered is, for example, sampled and registered before it is used by the computational unit 402. An output interface that is configured to be registered will, for example, write the output of the computational unit 402 into a flip-flop before it drives it to the external port. It is a common design practice to register interfaces in order to manage the timing convergence issues of multi-block system integration. However, it also adds to the latency in the system. This example of the present invention therefore provides a system designer with the flexibility to configure each interface in a different way depending on the particular needs of the system.

One example syntax of describing a user-defined interface using the extension language in accordance with this embodiment of the present invention is shown below:

interface <name> <width> <dir> <register>

Where <register> is an additional parameter that can be supplied by the designer, and specifies whether the interface is to be registered (reg) or not registered (noreg) (i.e. combinational timing) at the processor boundary. From such a description specified by a designer, the extension compiler and processor generator instantiate corresponding structure in the processor description. Accordingly, as shown in FIG. 4, with the register option selected for the inDATA input interface, a register 404 is included in the processor 400 in the signal path for the inDATA input interface. With the combinational option selected for the outDATA output data interface, no register is included In connection with FIG. 5, the extension language and compiler of the invention further provide the ability to optionally specify a processor pipeline stage at which a user-defined interface is read or written. One example syntax of describing a user-defined interface using the extension language in accordance with this embodiment of the present invention is shown below:

interface <name> <width> <dir> <stage>

Where <stage> is an additional parameter that can be supplied by the designer, and specifies the pipeline stage in which all instructions using the interface will read or write the interface. From such a description specified by a designer, the extension compiler and processor generator instantiate corresponding structure in the processor description.

Figure 5:
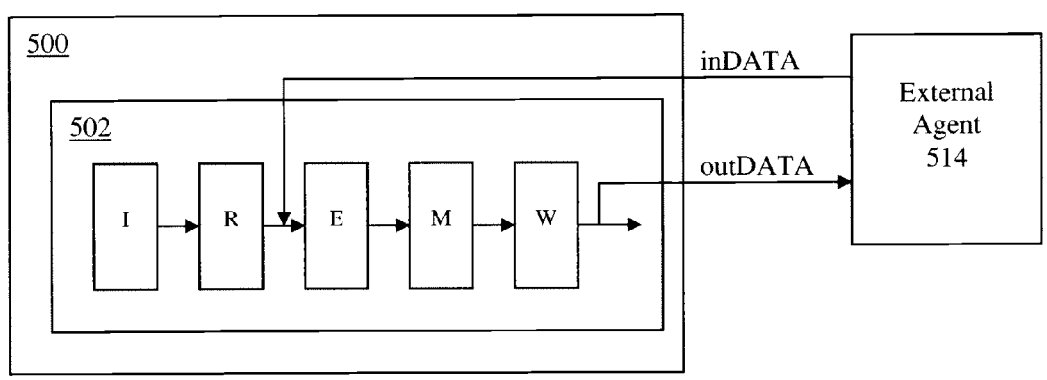

In one example of the invention, the base processor 500 in FIG. 5 has a five stage pipeline, and user defined interfaces can be read or written in stage E(1) and beyond. Accordingly, as shown in FIG. 5, with the E stage selected (i.e. <stage>=1) for the inDATA input interface, the input is fed to the E stage of computation unit 502, and with the W stage selected (i.e. <stage>=3) for the outDATA output interface, the output is provided from the W stage of the pipeline in computation unit 502.

Figure 6:
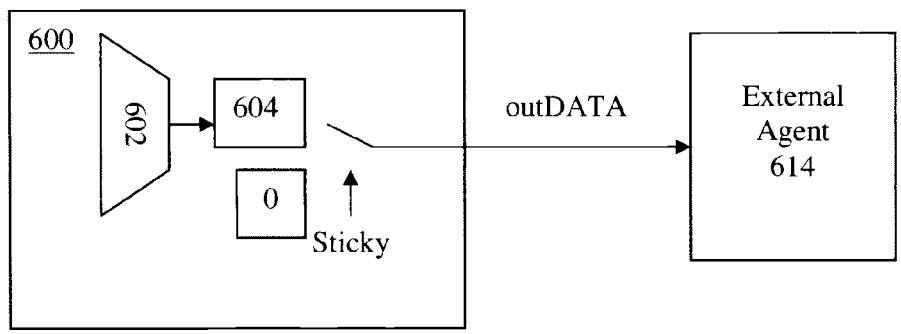

In connection with FIG. 6, the extension language and compiler of the invention further provide the ability to option-
ally specify how a user-defined output interface maintains output after it has been written to. A common need for systems using multiple processors is to convey processor status that is held constant, until changed, to another processor, coprocessor or an external device. In this embodiment, output interfaces take on the value that is being written by an instruction executing in the processor for one cycle, and has the value of 0 in all other cycles. However, it can optionally be sticky in the sense that each value written to this interface is held until the next write to the interface.

One example syntax of describing a user-defined interface using the extension language in accordance with this embodiment of the present invention is shown below:

interface <name> <width> out <sticky>

Where <sticky> is an additional parameter that can be supplied by the designer only if an output interface is specified, and specifies whether the output will be sticky. From such a description specified by a designer, the extension compiler and processor generator instantiate corresponding structure in the processor description.

For example, as shown in FIG. 6, processor 600 includes an output latch 602 that latches the output associated with user-defined interface outDATA. In one example of the invention, if outDATA is configured as a sticky output interface, latch 602 holds the old value and only changes its value each time it is written, and the data on interface outDATA is always provided from the latch. If outDATA is configured as a non-sticky output interface, the value provided to the external agent 614 will reflect the value written to latch 602 in the stage specified in its description and 0's in all other cycles.

According to a variation of this embodiment of the invention, a special form of sticky output interface provides a processor state. In this example, an instruction writes to an internal processor state that has a special <export> property, rather than writing to an output control interface. The exported state can be read or written to by instructions, and writes to the state are visible on interfaces of the processor just like other output interfaces. In one example, the same parameters of width and stage are available for such interfaces.

The following example syntax shows how a processor state can be directly exported as a control output interface.

state <name> <width> export [<stage>]

Preferably, user-defined state can be read or written by instructions at any pipeline stage specified by <stage> (the default is after the E stage). With the keyword export included, the architectural copy of the state is connected to an output interface. This interface thus gets updated whenever the architectural copy in the processor gets updated. This can happen, for example, when an instruction writing it commits in the pipeline, or later, if the state is written with the result of a computation that takes many cycles. This output therefore retains its value between writes, i.e. it is sticky.

According to an aspect of the invention, certain combinations of interface options can be automatically collectively combined, enabled and/or disabled via extension language syntax, so as to assist a designer in the design process.

One example syntax of describing a user-defined interface using the extension language in accordance with this embodiment of the present invention is shown below:

interface <name> <width> <dir> <type>

Where <type> is an additional parameter that can be supplied by the designer in connection with a user-defined interface. In one example implementation of the invention, there are two basic types of user defined interfaces: control interfaces (<type>=<control>), and data (<type>=<data>) interfaces.

The choice of whether an interface should be declared as a control interface or data interface will depend on their respective characteristics as described below In general, both interface types are used by instructions in the same manner, but the underlying implementation and protocol with external devices is different as will be apparent from the following descriptions.

Control interfaces are designed to convey control type information such as status. Input (i.e. <dir>=<in >) control interfaces are typically used to read control type information from external devices, including memories, processors, and logic blocks. Output (i.e. <dir>=<out>) control interfaces are typically used to send control type information to external devices. The two important aspects of control type interfaces are:

There is no handshaking between the external agent and the processor, the data is sampled or written on the interface by the processor when the instruction reading or writing it executes. There is no indication to the external agent as to when data is being read or written.

Reads and writes to control type interfaces by instructions can be presumed to always succeed. There is no provision for the external agent not being ready. The processor will always sample the input interface or write the output interface when needed.

The width of control type interfaces is configurable and logically unbounded. However, control type interfaces are usually used for relaying status information, and so typically are not large in size.

Data type interfaces are used to move various quantities and sizes of data in and out of a processor. The width of these interfaces is configurable and logically unbounded. Data interfaces are distinguishable from control interfaces in three important ways:

When a data interface is read or written, the external agent gets an indication of this event with an additional control or handshake signal, the type of which is specified by a parameter as will be described later.

Data interfaces can describe conditions under which the external agent may not be ready. In this case, the instruction that reads an interface cannot be allowed to complete, or in the case of an output interface, the data cannot be written.

For an input data type interface, once the processor reads data from an external device, it must be held inside the processor until consumed by a committed instruction. In particular, if the instruction that caused the input interface to be read is killed, the data must be preserved for use by a subsequent instruction reading the same input interface.

According to one aspect of the invention, therefore, additional parameters can be specified for data interfaces, which are described below.

Figure 7:
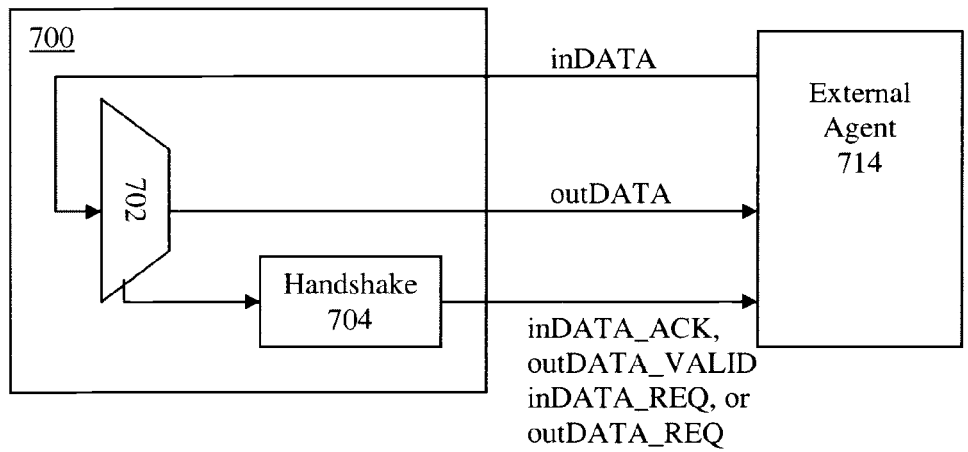

In connection with FIG. 7, the extension language and compiler of the invention further provide the ability to optionally specify additional handshaking signals that are associated with data transfers through user-defined data interfaces. Such additional handshaking signals may be desirable for communicating with certain types of external agents, as should become apparent from the below descriptions. It should be noted that although the term "handshake" may imply bi-directional communication, this is not necessary, and a broader one or two-way communication protocol is included in this embodiment, as should be apparent from the foregoing descriptions.

One example syntax of describing a user-defined interface using the extension language in accordance with this embodiment of the present invention is shown below:

interface <name><width><dir> data <handshake>

Where <handshake> is an additional parameter that can be supplied by the designer in connection with a user-defined data interface. This parameter describes the type of control signal sent to the external agent to request or acknowledge data reads or writes. This handshake signal is asserted appropriately whenever data is read or written by the processor. In one example of the invention, there are three possible options for this parameter: ACK (acknowledge for an input interface only); VALID (for an output interface only); and REQUEST (for both input and output interface). From such a description specified by a designer, the extension compiler and processor generator instantiate corresponding structure in the processor description.

For example, as shown in FIG. 7, when this option is specified, associated handshake circuitry 704 is automatically generated by the compiler in processor 700 that is capable of generating the appropriate type of handshake signal specified for the user-defined interface. For handshake type "ACK", a 1-bit control output signal named <name>_ACK is generated, and this signal is asserted only for one cycle when the data is read. For handshake type "VALID", a 1-bit control output signal <name>_VALID is generated, and this signal is asserted only for one cycle when the data is written. The ACK and VALID handshake signals are not asserted during the period that the processor is waiting before it can perform the read or write due to the external agent not being ready.

For handshake type "REQUEST", a 1-bit control output signal <name>_REQ is generated. And it is asserted when the processor wants to read or write data. It remains asserted while the processor is waiting to perform the read or write due to the external agent not being ready, unless the processor has a change of control flow, such as an interrupt, in which case, the request will disappear, thus de-asserting the signal. The external logic must react to this signal appropriately.

Figure 8:
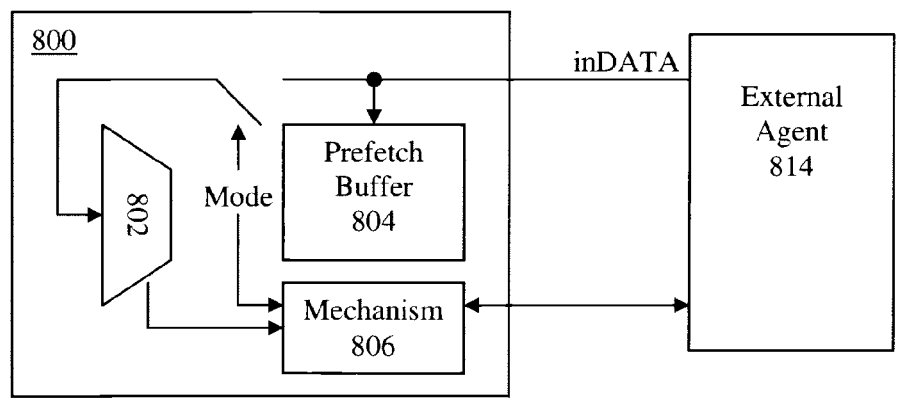

In connection with FIG. 8, the extension language and compiler of the invention further provide the ability to optionally specify the synchronization mode in which a user-defined input interface receives data in correspondence with processor execution.

One example syntax of describing a user-defined interface using the extension language in accordance with this embodiment of the present invention is shown below:

interface <name><width> in data <mode>

Where <mode> is an additional parameter that can be supplied by the designer only if an input data type interface is specified. In one example of the invention, there are two possible options for this parameter: "sync", which specifies data is transferred only when an instruction in the pipeline needs data, or "async", which specifies that data can be pre-fetched by the processor whenever possible, and asynchronous to the pipeline execution. From such a description specified by a designer, the extension compiler and processor generator instantiate corresponding structure in the processor description.

For example, as shown in FIG. 8, a processor having a user-defined interface inDATA includes a pre-fetch buffer 804 and a prefetch mechanism 806. In one example of the invention, with input interface inDATA configured for synchronous mode data transfer, a fetch signal is asserted to the external agent 814 by mechanism 806 only when instructions that need the interface are being executed and are decoded by the decoder.

If input interface inDATA is configured for asynchronous mode data transfer, mechanism 806 causes external agent 814 to be accessed and prefill a buffer 804 before any instructions that require the interface are executed. This can be done whenever the processor can read data from the external agent, as signaled by certain conditions in the processor which should be well understood by those skilled in the art. For example, if the external agent is available when the processor comes out of the reset mode, the processor will cause mechanism 806 to pre-fetch data into the buffer 802.

Figure 9:
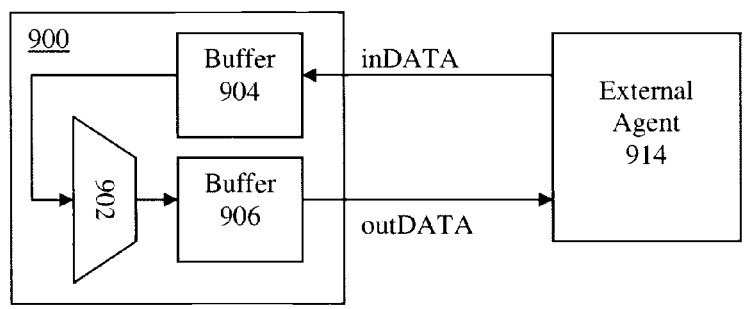

In connection with FIG. 9, the extension language and compiler of the invention further provide the ability to optionally include buffering of user-defined data type interfaces inside the processor. There can be different possible needs for buffering in the processor. First, data can be buffered in the processor to insulate the pipeline execution from the external agent's status. For example, in one example of the invention, the data from an input interface is prefetched into an input buffer before any instructions need it. Output interfaces can be buffered as well, where data produced by an instruction is first written to an internal buffer and subsequently written to the external agent when it requests data or is ready to receive data. It is important to note that data interfaces need to operate on a FIFO basis within the processor, that is, the order data is read from an input data interface is the same order it is used by committed instructions in the pipeline. Similarly, data can be written to the external agent only after the instruction writing it has committed and must be written in the order that the instructions produce data for each interface.

The amount of buffering that is provided to improve performance can range from 0 to an unbounded number of entries. The optimal amount of buffering can be a function of the bandwidth of the external device relative to the rate of consumption in a given application. If the rate of consumption is less than the device bandwidth, then no buffering is required to improve performance. For example, if the external device is running at half the frequency of the processor, and the processors needs 4 reads from the device every 100 cycles, then buffering of 4 entries in the processor will shield the processor from the clock ratio.

Second, buffering may also be needed to handle speculative reads and writes of data type interfaces. Reads and writes before the commit stage (W) are called speculative, since the instruction is not guaranteed to complete. For example, when an instruction reads a data type interface before the commit stage (W), it may not consume the data if it is killed in the pipeline, and in this case the data must not be lost. Similarly, if an instruction produces data before it commits in the pipeline, this data cannot be written to the external agent until the instruction commits. In these cases, an internal buffer is used, the implementation details of which will be described in subsequent sections below. In some cases, the buffer may provide both functions. The user is given control of the amount of buffering with the parameter described below.

One example syntax of describing a user-defined interface using the extension language in accordance with this embodiment of the present invention is shown below:

interface <name><width><dir> data <buffer-depth>

Where <buffer-depth> is an additional parameter that can be supplied by the designer in connection with a user-defined interface of type data. From such a description specified by a designer, the extension compiler and processor generator instantiate corresponding structure in the processor description. For example, as shown in FIG. 9, an associated buffer 904 is instantiated in the processor between the computation unit 902 and the external agent 914 for the associated input interface in DATA. Reads for this interface will thus take place between the computation unit 902 and the buffer 904. Alternatively or additionally, another buffer 906 is instantiated in the processor between the computation unit 902 and the external agent for the associated output outDATA. As indicated above, buffers 904 and 906 are preferably implemented as FIFO's.

Figure 10:
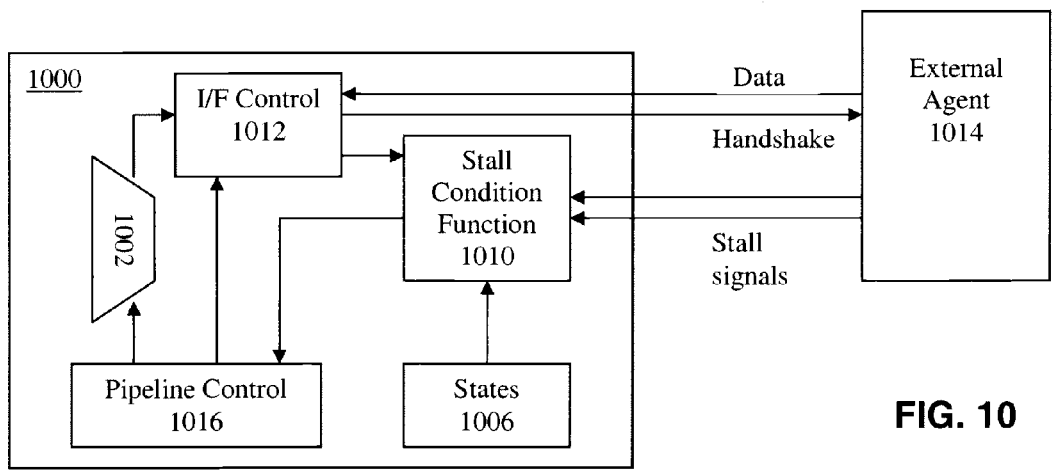

In connection with FIG. 10, the extension language and compiler further provide an optional ability, for data type interfaces, to specify conditions when the external agent is not ready for a data transfer. Generally, this specification according to this embodiment of the invention allows a designer to describe a way to automatically synchronize the processor to the external logic that is the producer of the data read by an input interface or the consumer of the data generated by an output interface. For inputs, it is an expression that specifies the condition when there is no data available for an input data interface. For outputs, it is an expression that determines that the external agent cannot receive new data from an output data interface. If this condition evaluates to be true, the read or write operation will not be successful, and how the processor reacts to it can be architecture dependent, and all means of resolving resource conflicts in the processor can be applied, as will be described in detail. In one example of the present invention, when the external agent is not ready, an instruction that needs to read or write data from the interface is not allowed to complete, by means of stalling the processor pipeline. This condition is referred to as a "stall" condition in the following description of the invention.

One example syntax of describing a user-defined interface using the extension language in accordance with this embodiment of the present invention is shown below:

interface <name><width><dir> data
{<stall condition>}

Where <stall condition> is an additional parameter that can be supplied by the designer in connection with a user-defined data interface. It is a Boolean expression that defines the condition under which the external agent is not ready for a data transfer. In one example of the invention, there are certain rules that apply to the definition of the stall condition. The rules are:

The stall condition of an interface must be defined with other input interfaces or processor state. Processor state may thus be to used to give software control over the stall conditions.

Any interfaces used in the stall condition expression must not have any handshaking or stall conditions of their own, i.e. they are control type interfaces.

For example, as shown in FIG. 10, the external agent 1014 can send one or more control type inputs (i.e. stall signals) to the processor, which are needed to determine the stall condition. The stall condition function block 1010 receives these user-defined signals from the external agent, and further receives signals from data interface control block 1012 indicating whether data is needed, as well as signals from processor states 1006, and uses these signals to determine whether to signal a stall condition. It should be noted that similar provisions can be made for a user-defined output interface.

According to this aspect of the present invention, a designer can design the processor so that function block 1010 sends a signal to pipeline control 1016 to stall the pipeline in computation unit 1002, if there is an instruction that requires access to external agent 1014, and external agent 1014 has a stall signal asserted. Subsequently, stall condition function block 1010 waits until the stall signal of external agent 1014 is deasserted, and then signals the pipeline control block 1016 to continue with instruction execution. This is similar to other pipeline interlocks due to resource dependencies, such as register file read after write hazard, where an instruction needs to read a register file entry that will be written by a prior instruction in the pipeline, before the prior instruction has had a chance to perform the actual write. The stall by pipeline control 1016 may be accomplished by any means available to the processor, as described in detail later.

In combination with a prefetch mode of data transfer specified for the interface, the stall condition need not affect the pipeline execution directly, but the same concepts can be applied. If the stall condition is true, then the processor cannot fetch data into its prefetch buffer. Thus, when an instruction in the pipeline attempts to read the interface, and the prefetch buffer is empty, the processor must wait for the buffer to have some data by stalling. It should be noted that in this example, the protocol for the user-defined interface between the processor 1000 and external agent 1014 is described by the stall condition function and the handshake signals associated with inDATA. In general, however, the stall condition and handshake can provide a flexible definition of a communication protocol between the processor and external device.

In particular, the protocol that the user-defined interface implements can be described in terms of both a master and slave mode that the processor operates under. For example, the handshake and stall condition can imply a master mode of operation where the read or write is initiated by the processor using the handshake output signal and the external agent controls the read write operation with the input signal to the processor that indicates if the agent is ready. Specifically, the following protocol is implemented for the interfaces:

An input user-defined interface uses the handshake output signal ACK or REQUEST to pull/request data from the external agent and the external agent uses the stall condition to grant or deny that request; and An output user-defined interface uses the handshake signal (e.g. VALID or REQUEST) to push/request that it has data to send out and the external agent uses the stall condition to grant or deny that request.

The protocol can represent a slave mode where the read or write operation is initiated by the external agent with the input signal to the processor that indicates if the external agent is ready, and the processor controls the read or write operation with the handshake output signal. In this mode, the meaning of the handshake and the stall condition input is therefore reversed:

An input user-defined interface uses the handshake signal REQUEST to indicate to the external agent that the processor is ready to accept requests from the external agent. The external agent can then push data into the processor's internal buffer by deasserting the stall condition signal, which is a data valid indicator in this context. The handshake and the stall condition signals can be physically inverted outside the processor for this protocol, such that ~REQUEST becomes the not ready or stall condition input to the external agent, and the data valid signal from the external agent is inverted to connect to the stall condition input of the processor. Thus, when the external agent wants to write data to the processor, it checks if the processor is ready to accept data by testing if the ~REQUEST output of the processor is deasserted, and if so, it can assert the valid signal to complete the write transaction.

An output user-defined interface uses the handshake signal REQUEST to indicate to the external agent that it has data that is ready to be read from the processor by the external agent. The external agent can then read or pull this data from the processor by deasserting the stall condition signal, which can also be thought of as a request signal in this context. The handshake and the stall condition signals can by physically inverted outside the processor for this protocol, such that the ~REQUEST signal becomes the not ready or stall condition input to the external agent, and the data request signal from the external agent is inverted to connect it to the stall condition input of the processor. Thus, when the external agent wants to read data from the processor, it checks if the processor has data by testing if the ~REQUEST signal is deasserted, and if so, it can assert the data request signal to complete the read transaction.

For an input user-defined interface, the processor operates in the master mode when the data transfer is specified as synchronous to the processor pipeline, as described by the user by the data transfer mode parameter. If the data transfer mode is prefetch, then the processor can operate in either of the two modes:

Master mode—the processor decides to prefetch data based on some processor state or hardwired algorithm.

Slave mode—the processor waits for the external agent to write data to its prefetch buffer.

As further shown in FIG. 10, the user-defined interface is controlled by the pipeline control block 1016 of the processor that issues requests to the interface control block 1012 to get data either as instructions are decoded that use the interface, or in an example of combination with a prefetch mode, when the pipeline wishes to prefetch data. When the interface control block 1012 gets indication that data is to be read from the external interface, it relays the request to the stall function block 1010 which generates the control signal that indicates whether data can be read or not, depending on control inputs from the external agent, and optionally, some internal processor state 1006. The stall function block 1010 relays control status back to the pipeline control block 1016 to indicate whether data is available when an instruction that requires data from/to the interface is decoded, and the pipeline control block 1016 performs the appropriate actions for that architecture. The mechanism by which the instruction is made to wait until the external agent is ready is dependent on the architecture of the processor. The instruction may be held in the decode stage (R) by means of adding bubbles in the pipeline, a technique referred to as dispatch stall or interlock. The instruction can proceed beyond the R stage and be held in the pipeline stage where it reads or writes data by stalling the progress of the pipeline, by clock gating or re-circulating control, a technique known as pipeline stall. The instruction can create an entry in a scoreboard, or it can be replayed in the pipeline until data is available. The processor can also change context or take an exception. In an example of the present invention, described in the examples in this document, the pipeline stall method has been used. The interface control block 1012 connects to the external agent 1014 to read the data and assert the handshake signal. The data is then passed to the computation unit 1002 after optionally registering it.

Figure 11:
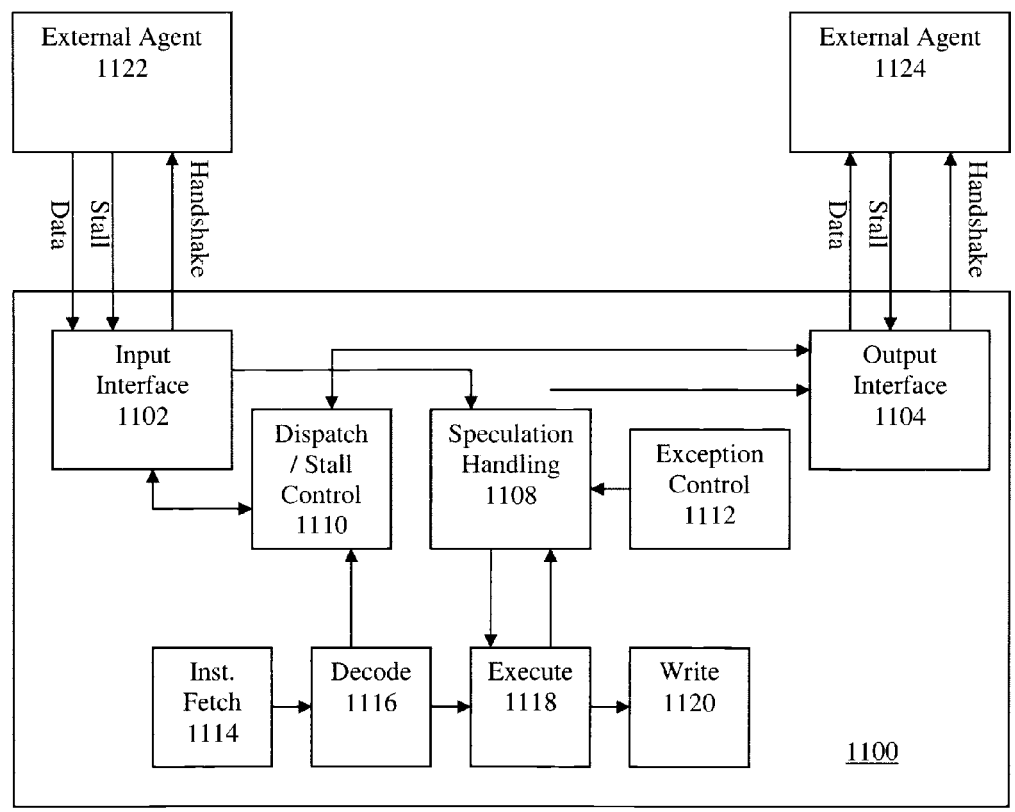
FIG. 11 is a block diagram of a processor having user-defined interfaces that can be designed according to a further embodiment of the present invention.

The above features and aspects of the invention can be combined and exploited in many useful and advantageous ways. FIG. 11 is a generalized block diagram of a processor 1100 according to another preferred embodiment of the invention.

In particular, FIG. 11 shows the basic blocks that connect one user-defined input data interface and one user-defined output interface to the processor pipeline execution path. Although only one input and output data interface are shown in this figure, it should be apparent that there could be several data and control type interfaces, and that the interfaces can communicate with one or several different external agents.

As shown in FIG. 11, when a user-defined data type interface is selected for a processor design, the extension compiler generates one or more ports or pins in the processor 1100. The first is the "Data" pin itself, which has a bit-width as wide as specified by the user, and the direction is "in" for an input interface, and "out" for an output interface. There is an additional one-bit output for the handshake signal that is automatically generated for the interface according to the handshake protocol specified. The compiler may further generate optional control interfaces associated with a data interface, if there is a stall or Data Ready condition for the interface, as should be apparent from the descriptions above.

As further shown in FIG. 11, the compiler generates an external interface block for each data type user-defined interface. This block (1102 and 1104) interfaces directly to the external agent (1122 and 1124) to read or write the data, assert the handshake signal and receive the stall condition as defined for each interface. All data passes through the external interface and is registered as dictated by the timing requirements for that interface. This block also interfaces with the dispatch/stall control block 1110 in the processor. As shown in this embodiment of the invention, requests to read and write interface data are controlled by the dispatch/stall control block 1110 of the processor. It issues a signal to the external interface block 1102/1104 as instructions are decoded, i.e. when an instruction that read or write the interface is in the R stage, or when the processor wishes to prefetch input data. The interface control block 1102/1104 relays control status back to the dispatch/stall control to indicate whether data is available when an instruction that requires data from/to the interface is decoded, and the dispatch/stall control performs the appropriate actions for that architecture, which may include a dispatch stall or interlock, pipeline stall, creation of a scoreboard entry, interrupt or exception, or jump to another context.

As will be apparent from FIG. 11, input and output data interfaces 1102, 1104 have an interface to the processor pipeline that is analogous to other core blocks (not shown) such as loadstore units and register files. Moreover, data interfaces are intimately integrated into the processor, unlike some coprocessor designs which have a more remote relationship to the pipeline.

Specifically, for a user-defined input data interface, input interface block 1102 is generated by the extension compiler and processor generator and performs several functions, depending on the set of options provided by the designer. It can be thought of as a combination of various interface components shown in FIGS. 3 through 10 and described in connection therewith. Depending on the parameters specified for the associated interface, it performs several functions:

It registers the data if needed.

It generates the handshake signal to the external agent 1122. This logic is depends on the type of handshake, data transfer mode, stall condition, and buffering. For example, if the handshake is of type "ACK", data transfer is synchronous, the interface has no stall condition and no buffering, then the signal received from the block 1110 in the R stage of a decoded instruction can be flopped to the stage when the instruction should read the data to generate the handshake signal.

If the interface has a stall condition, it also generates an internal signal to the processor pipeline dispatch/stall control block 1110 that indicates that there is no data to read, and in one example of the invention, this will cause a pipeline stall. The stall signal is generated based on the state of the internal buffer for this interface, if any, and the stall condition as specified by the interface, based on external control signals from 1122. If an internal buffer exists, and it has data, then the stall signal is not asserted regardless of the external stall condition.

The data received from the external agent is supplied to appropriate location in the processor pipeline (by default the (E) stage 1118), via an optional block 1108, which performs speculation handling as will be described in more detail below.

For a user-defined output data interface, block 1104 receives data from the computation unit 1106 and provides a number of ports connected to the external agent 1124. The extension compiler and processor generator generate similar hardware descriptions for block 1104 as for block 1102 for any user-defined output data interface in accordance with options specified by the designer. Depending on the specified options, the external interface block performs several functions:

It registers or buffers the data received from the computation unit 1106.

It generates the handshake signal to the external agent 1124. This logic depends on the buffering, stall condition and handshake. For example, if the interface is registered with "VALID" handshake and no stall condition, then the control signal received from the block 1110 in the R stage can be flopped to the stage that the instruction writes data, and this signal will enable the register or flop that registers data from the computation unit. The control signal can be flopped for one more cycle to generate the VALID signal.

If the interface has a stall condition, it also generates an internal signal to the processor pipeline dispatch/stall control block 1110 that indicates that the instruction cannot write data, and in an example of the current invention, this will stall the processor pipeline. If the data is buffered in the processor, the stall signal is asserted if the buffer is full. If there is no buffering, then the stall signal is generated based on the external stall condition as specified by the interface, based on external control signals from 1124.

Data may be buffered in the processor by moving the output data interface from the instruction pipeline into a separate buffer, analogous to a processor writebuffer. The writebuffer continues to arbitrate for the interface, thereby isolating the pipeline from the external agent's stall condition. If the data is buffered inside the processor, the interface block 1104 will contain the buffer, and the associated control logic, that writes data to the external agent whenever there is valid data in the buffer, and the external agent can accept new data.

An advantageous aspect of the invention is that interface data can be indistinguishable to an execution unit from other operands from register files, states, or memory as shown in FIG. 2. As with other operands, there is control to resolve data and resource conflicts relative to the operands. Simple register operands can be interlocked with dispatch stalls or bubbles, because there is a known and fixed schedule for the generation and usage of those operands. Memory interfaces have more complicated conflict resolution because all conflicts are not known at the time of dispatch. Memory conflicts are generally resolved with pipeline stalls in the memory stage of the pipeline or by replaying the instruction. Advanced pipeline architectures have scoreboards that can manage resource conflicts.

According to an aspect of the invention, data interfaces can have all modes of conflict resolution available in the processor. The mechanics of the conflict resolution are processor architecture specific and not unique to the user defined interface additions. In general, for all input data interfaces in a non speculative processor architecture, the instruction accessing the input data interface cannot commit unless it has successfully read data from the input interface, and any mechanism that is available in the processor architecture can be used to accomplish this goal. Preferably for all output data interfaces, all output data is held within the processor until the instruction writing the interface has committed and the external agent can receive the data, and any mechanism that is available in the processor architecture can be used to accomplish this goal as will be understood by those skilled in the art.

For example, in the prefetch mode for an input data interface, it can be conservatively known at the dispatch stage whether the prefetch buffer has any data which will allow an instruction accessing that input data interface to succeed. If there is no data buffered, then the instruction could stall in the dispatch stage. In the non-prefetch mode, input data interfaces can be read during the dispatch stage of an instruction that requires the interface and then buffered until the instruction reaches the pipeline stage that the interface data is used in the computation. The instruction can stall in the dispatch stage until it has successfully read data. Similarly, it can be conservatively known in the dispatch stage whether there is sufficient buffering space available for an output data interface write to succeed and if there isn't sufficient buffering space then the instruction can stall in the dispatch stage. The reason this is conservative is that even though the computation unit of the instruction will not read or write the interface until a later stage, a decision is made earlier in the dispatch stage.

Instructions can also be allowed to advance past the dispatch stage if there is some method of stalling the pipeline at the stage the interface is read or written in the computation unit. Post dispatch stalls can be accomplished by pipeline slips, recirculating control, clock gating, enabled flops or whatever means are available in the particular processor architecture. Replays can be used instead of stalls or in conjunction with limited stalls. In the replay case, an instruction would replay continuously until it had successfully read a data input interface, or was guaranteed to write the output interface. A scoreboard entry can be made for data interfaces. When an interface is unavailable the instruction would be posted in the scoreboard and the pipeline would execute as the scoreboard architecture dictated, e.g. switch contexts, execute out of order.

Referring back to FIG. 11, another aspect of this preferred embodiment of the invention is the ability of a designer to employ schemes for speculation handling, as will now be described in more detail.

Generally, as will be explained in more detail below, reads of input data interfaces and writes to output data interfaces before the commit point are speculative, i.e. the instruction that reads or writes the interface is not guaranteed to complete. The speculation handling block 1108 in this embodiment of the invention is automatically generated by the extension compiler and processor generator in such cases to implement all the necessary circuitry to preserve data values across such speculative execution. A user-defined data interface that attempts access after the commit point is not speculative and therefore the speculation handling block is not generated and/or the block performs no function for that interface.

For example, in an input data type interface, when an instruction reads the interface, a handshake signal is asserted to the associated external agent to retrieve the data. If the instruction is killed in the pipeline after the handshake signal is asserted, without any special speculation handling, the data read will be lost because the external agent that produced the data already considers it read. This is different from speculative reads of control type interfaces, since the read of control interfaces have no effect on the system. Therefore, the way speculative reads are handled for input data interfaces must ensure that data is not lost.

There are many ways to guarantee that data is not lost. One would be to make the external source handle the speculation, i.e. expose a control signal that lets the external logic know that the read was not completed, and the external logic can be also designed in a speculative way to handle it correctly. However, this makes the interface model difficult to use and cannot be connected to standard devices such as queues. A different solution is to make the external logic unaware of the speculative nature of the read. The data read from an input data interface is saved in a speculative buffer until the instruction that used the data as an operand passes the commit point. If that instruction does not commit, then the next time any instruction that reads the same input data interface as an operand comes down the pipeline, it will use the buffered data from the speculative buffer rather than the input data interface. During this second read, no external read transaction takes place. Data read from an external source is not lost, it can only be consumed by an instruction after an arbitrary number of cycles. Thus the speculative nature of the read is completely handled within the processor.

According to one example of this embodiment of the invention, speculation handling block 1108 includes a speculative buffer for data interfaces. When data is read from the external agent and passed on to the pipeline, it is also written into the speculative buffer. The speculation handling block receives a signal from the exception control block 1112 to signal that the instruction is committing, in which case, the data can be removed from the buffer, as it has been consumed, or block 1112 can signal that the instruction is being killed in the pipeline, in which case the data stays in the buffer.

In one preferred example, the speculative buffer is a speculative FIFO that has special control to allow the FIFO to be speculatively read or written. The buffer is automatically generated by the extension compiler and processor generator and its size is based on factors included in the options selected for the data interface, such as the pipeline stage of attempted input/output. The hardware cost associated with the feature is the extra buffering in the processor, which is proportional to how early the data is read in the pipeline and what kind of performance is desired. A designer can also be allowed to control this parameter and/or to manually cause a buffer to be generated through the <buffer-depth> syntax of the interface definition as described above. The following implementation details of the speculative buffer can thus be applied to implementation of a performance buffer according to one example of the invention, where the buffer depth is for optimal performance, i.e. to allow full pipelining of reads of the interface. In this case, the depth of the buffer is related to (c3−cN), where c3 is the commit stage and cN is the stage when the instruction reads the interface into the computation unit. Examples are shown later to illustrate the effect of a smaller depth of the speculative buffer on the performance.

FIG. 12 is a block diagram illustrating an example speculative FIFO for an input interface according to this embodiment of the invention. As shown in FIG. 12, a speculative FIFO 1202 has the following input controls: Push—pushes data onto the FIFO; and Pop—pops data off of the FIFO. FIFO 1202 has the following output status signals: Empty—indicates that the FIFO is empty; and Full—indicates that the FIFO is full. FIFO 1202 further has the following data path signals: DataIn—representing data to push onto FIFO; and DataOut—representing data at the head of the FIFO. FIFO 1202 also has the following additional interfaces: SPop—speculatively pop data from the FIFO; SCancel—cancel all speculative reads that have not committed; and SEmpty—indicates that the FIFO is speculatively empty The input interface speculative FIFO 1202 can be implemented as a data array addressed as a memory or register file, with a pointer for reads and a pointer for writes. In such an example, all pointers increment, and wrap to 0 whenever they increment beyond the number of speculative buffer entries. The pointer for writes increments with every push into the FIFO, i.e. when "Push" is asserted. which happens whenever the processor reads data from the external agent via input interface 1204. There are two read pointers: a speculative read pointer and a committed read pointer. The speculative read pointer increments on every speculative pop, i.e. when "SPop" is asserted, and the committed read pointer increments on every committed pop, i.e. when "Pop" is asserted. If a speculative pop is cancelled by asserting "SCancel", then the speculative read pointer is reset to the committed read pointer. When the external interface block reads data from the external agent, it pushes it into the FIFO by asserting "Push". When an instruction in the pipeline reads the interface, the FIFO is speculatively popped by asserting "SPop" "Pop" is asserted when an instruction that caused a speculative pop commits in the pipeline. When an instruction that caused a speculative read is killed in the pipeline, "SCancel" is asserted. A sample Verilog code of the speculative buffer with 4 entries in shown in Appendix A, which forms part of the present disclosure and is incorporated by reference herein.

The speculation handling features of this embodiment of the invention can be integrated with other features of the invention discussed above in certain useful ways. As discussed above, a prefetch buffer can be used to buffer input data interfaces. The mechanism for the prefetch operation can be programmed via processor control state. For example, the dispatch/stall control block 1110 can be programmed to request data from the input interface whenever the speculative/performance buffer 1202 is not full. Even if there is no prefetch, the interface may be registered, and therefore have at least one buffer at the input interface control block.

Figure 14:
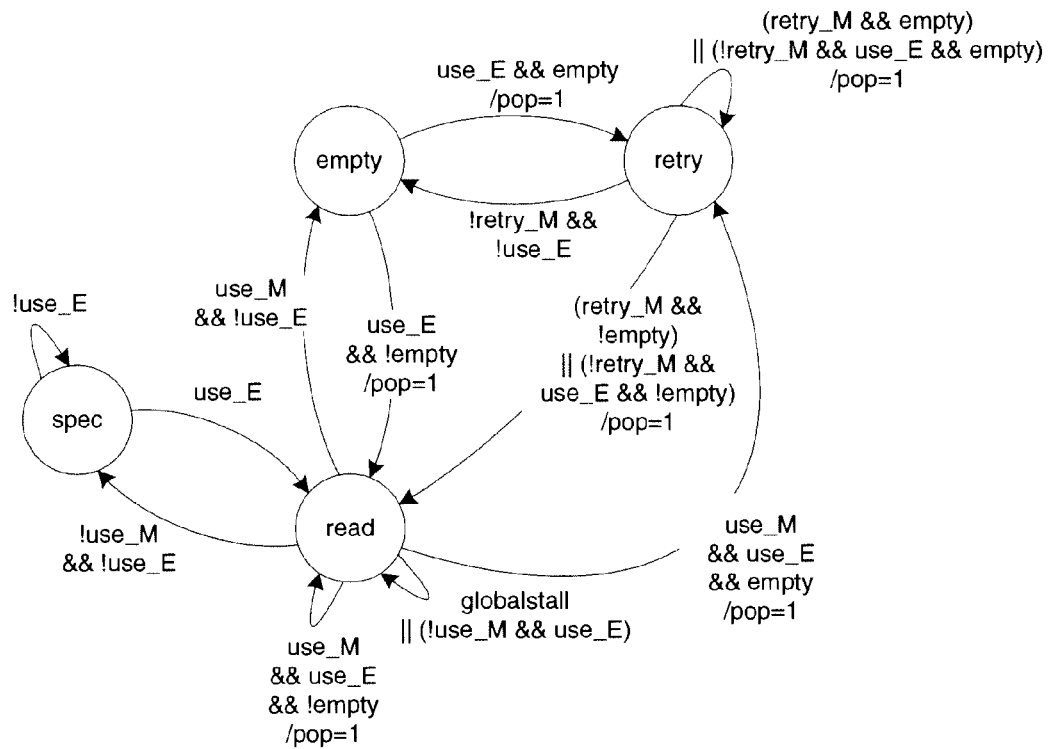
FIG. 14 is a state diagram illustrating how an input interface can be registered with speculation handling according to the invention.

If an input interface has been configured to be registered or prefetched, the interface block can combine the buffer for registering and the speculation handling, controlled by a state machine. FIG. 14 illustrates an example finite state machine that can be implemented in an input interface block 1102 that is configured to register data.

As can be seen in FIG. 14, the register states in this example are as follows:

empty: idle state where there is no valid data in the register read: state where data has been read from the interface and is available to the requestor.

retry: a request did not succeed because the stall condition was asserted, so the request is retried.

spec: the request for data succeeded, but the requestor no longer needs this data. In this state, the register acts as part of the speculative buffer. Non speculative interfaces do not need this state. A prefetch mechanism would also generally not cancel its requests. The most common cancellation would be from an instruction speculatively executing and being killed by an exception or interrupt.

The input control signals are as follows:

use_E: data is desired the next cycle. Data may be requested either by an instruction executing in the pipeline or a prefetch mechanism.

use_M: data is desired this cycle. Data may be requested either by an instruction executing in the pipeline or a prefetch mechanism.

empty: the stall condition of the interface retry_M: continue attempting to read from an interface with its stall condition asserted.

The Moore outputs are as follows:

pop: the handshake signal

In this example, the input data register can be counted towards the total amount of buffering for an interface, thereby allowing the speculative buffer or performance buffer to have one less entry.

Speculative writes to data interfaces never leave the processor until the instruction writing the data has committed. However, it may be desirable to produce the data earlier in the pipeline (e.g. the execute stage) and register it until the instruction commits. This can be achieved by pipelining the output of the computation units, and write it to the writebuffer once the instruction commits. The writebuffer, as described with relation to FIG. 11, is in the external interface block 1104, and buffers the data until the external agent is ready. In an example embodiment of this invention, the speculation handling and the write buffer mechanisms can be combined into a single buffer, as will be explained below. The buffer is a speculative FIFO, complementary to the input speculative FIFO. Writes to the interface are speculatively pushed into this FIFO and committed later. The number of entries in the buffer generated by the extension compiler and processor generator can be determined by several factors. In one example, for optimal performance, i.e. being able to issue back to back writes to the interface, the depth is determined as (c3−cN), where cN is the stage when the instruction writes the data to the buffer.

A block diagram illustrating an example implementation of a speculative write to an output data interface is shown in FIG. 13. As shown in FIG. 13, the output speculative FIFO 1302 is similar to the input one described in connection with FIG. 12. The I/O signals of the speculative FIFO 1302 are: Push—pushes data onto the FIFO; Pop—pops data off of the FIFO; Empty—indicates that the FIFO is empty; Full—indicates that the FIFO is full; DataIn—data to push onto FIFO; DataOut—data at the head of the FIFO; SPush—speculatively push data to the FIFO; SCancel—cancels all speculatively pushed data or writes that have not committed; SFull—indicates that the FIFO is speculatively full.

During normal operation, data is pushed to the FIFO 1302 speculatively by asserting "SPush" when an instruction having an output data interface operand reaches a stage for writing the interface data. When the write or push operation is known to have committed (i.e. all side-effects are guaranteed to complete), the speculative write is also committed by asserting "Push". In addition, a state machine checks the status of the FIFO every clock cycle to see if the FIFO is empty. If the FIFO has data, and the external agent is ready to accept data, it will pop the FIFO, write the data to the output interface 1304 and assert the VALID signal.

The output interface speculative FIFO can be implemented with a data array addressed as a memory or register file, with a pointer for reads and a pointer for writes. In this example, all pointers increment, and wrap to 0 whenever they increment beyond the number of speculative buffer entries. The pointer for reads increments with every pop from the FIFO, which happens whenever the processor does a write to the external interface. There are two write pointers: a speculative write pointer and a committed write pointer. The speculative write pointer increments on every speculative push, "SPush", which happens whenever an instruction in the pipeline writes new data destined for the interface. The committed write pointer increments on every committed push, "Push", which happens when an instruction that caused a speculative push commits in the pipeline. If a speculative write is cancelled, as indicated on "SCancel", the speculative write pointer is reset to the address of the committed write pointer. This happens when an instruction that did a speculative write is killed in the pipeline. If the speculative full output, "SFull", of the FIFO is high, and there is an instruction in the pipeline stage cN, where it wants to write new data to the buffer, this will cause a pipeline stall until "Sfull" becomes low.

The following sections describe different examples of input data interfaces that can be described using an extension language and compiler in accordance with the above-described preferred embodiment of the invention.

Input Data Interface Example 1

Non-Speculative Read

The simplest input data interface in this embodiment is one that is only used by instructions that have passed the commit point and read the input interface in the same cycle that the instruction wishes to operate on the data. Reads of input data interfaces after the commit point are not speculative, since the commit point is defined to be the point at which an instruction is guaranteed to complete. An instruction that uses an input data interface as an operand receives that data in the pipeline cycle that it has scheduled that operand to be used in.

The processor in this example comprises a five-stage processor with a user-defined instruction that uses an input data wire as an operand. The processor pipeline has the stages I (instruction decode), R (register read), E (execute), M (memory access) and W (write-back). In this example, the stages R to W are numbered from 0 to 3 for the user defined instruction syntax, to specify the schedule of when operands are read and written by an instruction. The input data wire is read in cycle 4, i.e. the cycle after the commit stage. The following code describes the input data wire interface and the operation that uses it.

interface MYDATA 32 in 4 data noreg sync ack
// name: MYDATA
// width: 32
// direction: input
// stage: 4
// timing: combinational
// data transfer on demand, no prefetch
// handshake: ack
// stall: none
// buffering: none
operation MYOP { } {inout ACC, in MYDATA} {assign ACC=ACC+MYDATA;}

As can be seen, the user-defined interface is defined to be 32-bits wide, an external interface of the processor, an input, read in cycle 4 of the pipeline, and is a data type interface, not registered, and with a handshake protocol of type ACK. The operation uses this input data interface as an input operand to an accumulator, which is an internal state of the processor.

Figure 15:
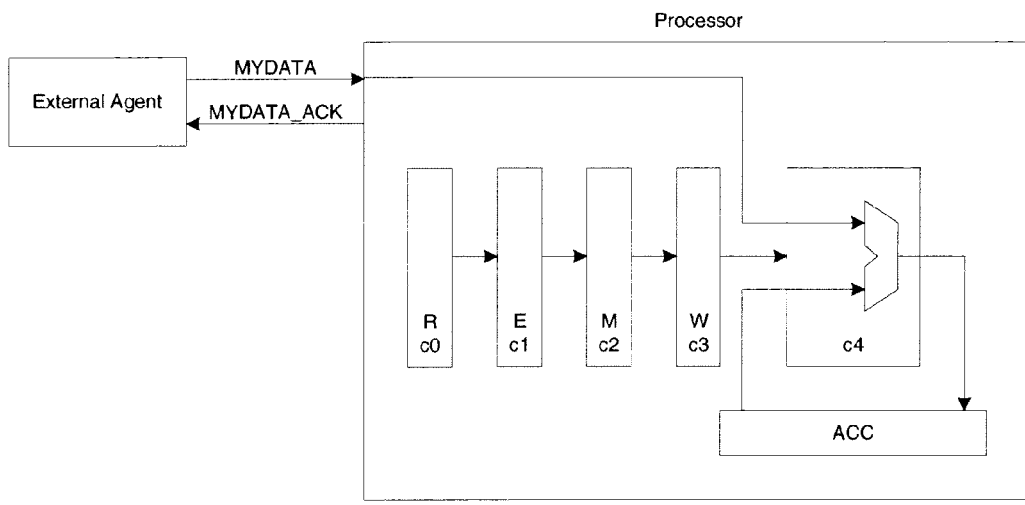
FIGS. 15-22 are block diagrams and timing diagrams illustrating example user-defined input interfaces that can be designed according to the invention.

FIG. 15 is a block diagram of a processor according to this example. In this example, the external port for the interface MYDATA is defined as being read in the cycle 4, or c4 in the diagram. Since W or c3 marks the commit point of the processor, this interface is read after the instruction commits. The read is therefore non-speculative. When the data is read by the processor, the ACK handshake signal is asserted for one cycle and the external agent can change its state based on it. In this case, since the instruction is guaranteed to complete, the data is always used when read, and it cannot be lost due to the instruction being killed. Another point of interest is that the cycle c4 is shared between the external logic and the computation in the processor. In this case, the user must be aware of the timing constraints. The exact timing of the signals will depend upon the physical layout and the levels of logic.

A variation on the design of FIG. 15 would be to add a register between the input interface and the processor pipeline, in order to improve timing. In this case, the data will be read from the external agent in c3 and will be flopped to the instruction data-path in c4. As shown below, the declaration of such an interface includes a command indicating that it should be registered. This would be a safer design for timing, but would increase latency.

interface MYDATA 32 in 4 data reg sync ack

The block diagram is similar to that in FIG. 15, with an additional register along the MYDATA datapath.

Input Data Interface Example 2

Speculative Read

Consider Example 1 above, and suppose that interface MYDATA is read in the execution stage rather than after the commit stage as shown in the interface description below. The operation MYOP reads this as an operand as before.

interface MYDATA 32 in 1 data noreg sync ack
operation MYOP {inout ACC} {in MYDATA} {assign ACC=ACC=ACC+MYDATA;}

Figure 16:
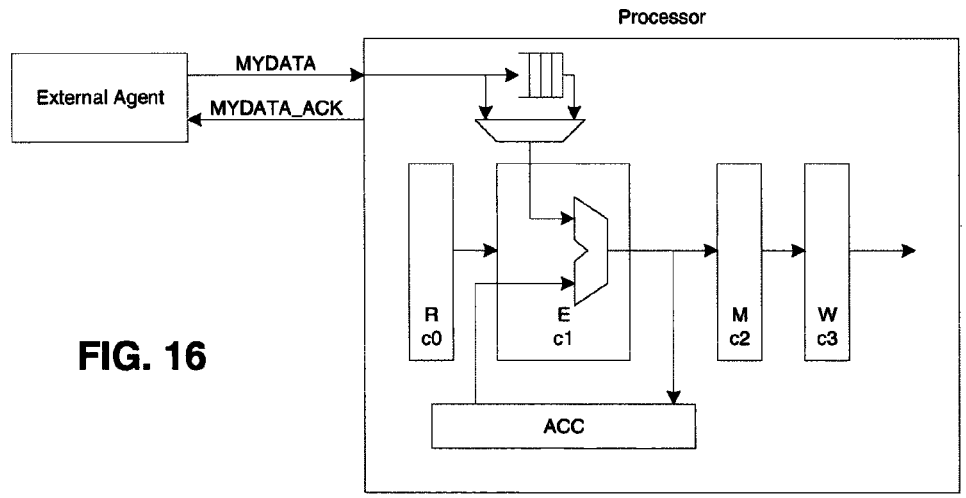

FIG. 16 is a block diagram of a processor according to this example. In this example, the data interface is read into a speculative buffer in the stage c1 when the data is configured to be read by the interface description. If the instruction is killed before it reaches the commit stage c3, the data remains in the buffer. Data is flushed from the speculative buffer in stage c3. This buffer can be designed as a first-in-first-out (FIFO) queue such as that described above in connection with FIG. 12 where the depth of the queue is configurable and can depend on the throughput desired.

As set forth above, the speculative buffer has at least one entry. It should be apparent that the number of entries in the buffer decides the number of speculative reads that can co-exist in the pipeline before the commit stage, since the buffer must be able to store the data if all the instructions in the pipeline got killed. If the buffer has only one entry, then the processor cannot execute back-to-back instructions that read the queue. This is illustrated in the timing diagram in FIG. 17.

Figure 17:
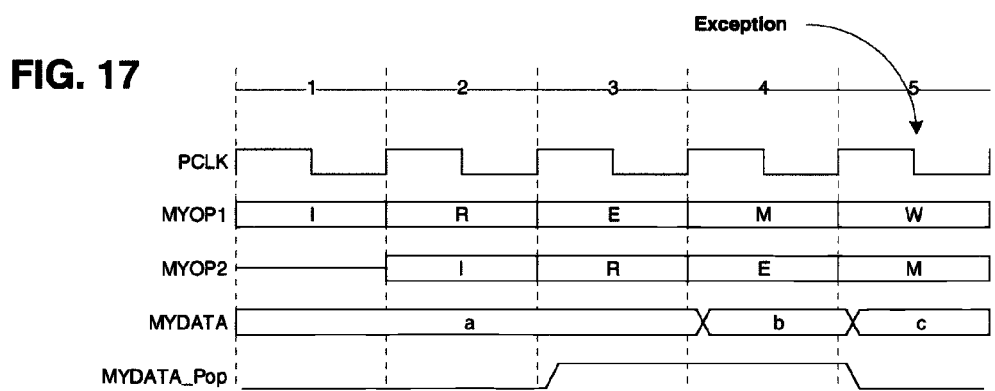

In FIG. 17, there are two back to back instructions "MYOP" that read the interface MYDATA. An exception occurs in cycle 5. When the exception is taken, two MYOP instructions have speculatively executed and read from the input data interface values 'a' and 'b'. Both of these instructions will be killed and the data from both of these will need to be buffered. A two-entry speculative buffer is thus required to allow two speculative accesses to be simultaneously outstanding.

Figure 18:
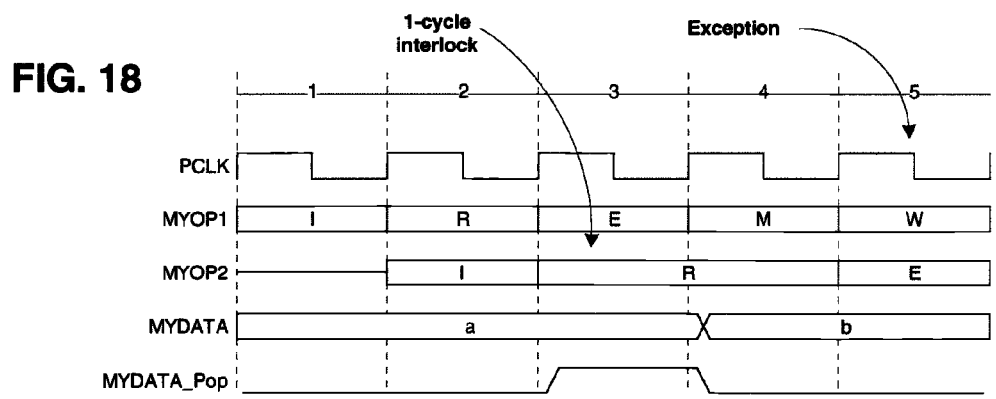

If a one-entry speculative buffer is selected, then the second instruction must interlock due to the speculative buffer resource hazard, as shown in FIG. 18. Notice that the second MYOP instruction stays in its R stage until the previous instruction commits and its data can be removed from the buffer. This means that the program throughput is limited. If the buffer has two entries, then the bubble is not needed, and the program can issue a read instruction every cycle, i.e., it runs at full bandwidth. As a general rule, the number of buffer entries required for optimal performance is (commit stage–read stage). In this case, it is two (c3–c1).

Figure 19:
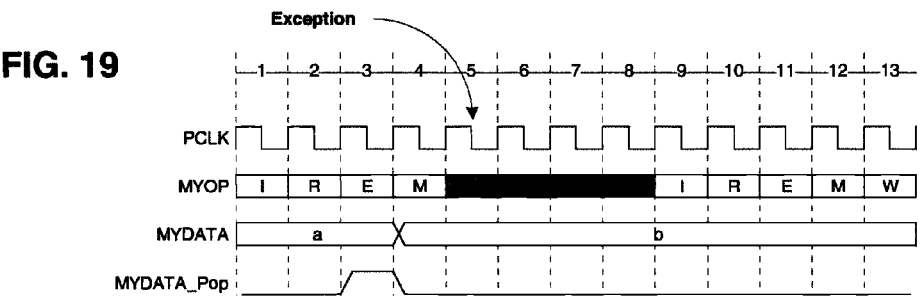

FIG. 19 is a timing diagram showing a case where the operation reads the input data wire in cycle 3, which corresponds to the instruction's c1 stage and the stage it is scheduled to use the input data wire. In cycle 5, the instruction is killed due to some event in the processor. Although the instruction was killed before it passed the commit point, the data it read (a) is not lost. Later, when any instruction in the pipeline needs data from this interface, rather than reading a new value from the input data interface in cycle 8 (value would be b), it uses the buffered data. In relation to the timing diagram in FIG. 19, this happens when the instruction MYOP is retried, in cycle 11.

This feature is one of the key and unique aspects of the present invention because it allows users to not require visibility of the processor pipeline and allow them to design the external logic in a completely non-speculative manner. For example, if the user-defined data interface was reading from an external agent being a queue, the queue design need not be speculative even though the processor reads the queue speculatively. The hardware cost associated with the feature is the extra buffering in the processor, which can be proportional to how early the data is read in the pipeline and what kind of performance is desired. The user can be allowed control over this parameter through the syntax of the interface definition.

One variation of the design of FIG. 16 would be to add a register between the input port and the processor pipeline, in order to improve timing. The declaration of such an interface would include a command indicating that it should be registered, such as the following example:

interface MYDATA 32 in 1 data reg sync ack

This registering is different from registering that occurs with non-speculative input data interfaces. Latching data into the interface register creates a speculative access. The speculative state of the interface can be resolved in several different ways. The interface register can always push its data onto the speculative buffer, even if there is no valid instruction in the pipeline. Alternately, the interface register can act as an entry of the speculative buffer. In one example of the present invention, the timing resister is part of the speculative buffer, and is controlled by a state machine such as that described in connection with FIG. 14.

Input Data Interface Example 3

Stall Condition

Figure 20:
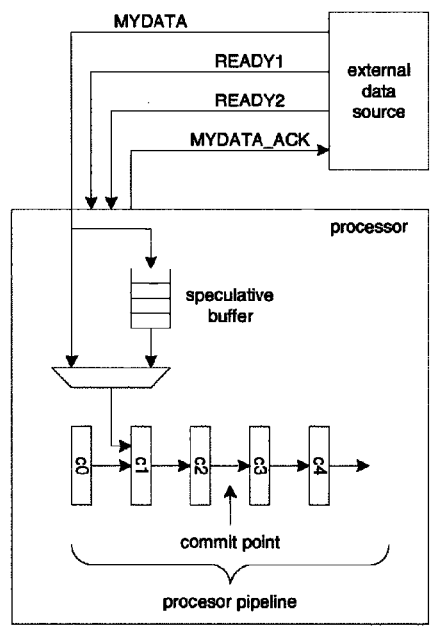

The example system from FIG. 16 is extended in this example by adding two data ready indicators from the external data source (i.e. external agent). They must both be asserted to indicate that there is available data. FIG. 20 is a block diagram illustrating a processor having these additional interfaces.

The following code describes the two input control interfaces and redefines the data interface MYDATA to add the stall condition. The control interfaces READY1 and READY2 must be read in the same cycle as the read of the interface MYDATA, which in this example is cycle 1.

interface READY1 1 in 1 control noreg
  interface READY2 1 in 1 control noreg
  interface MYDATA 32 in 1 data noreg sync ack
  {!(READY1 && READY2)}

Figure 21:
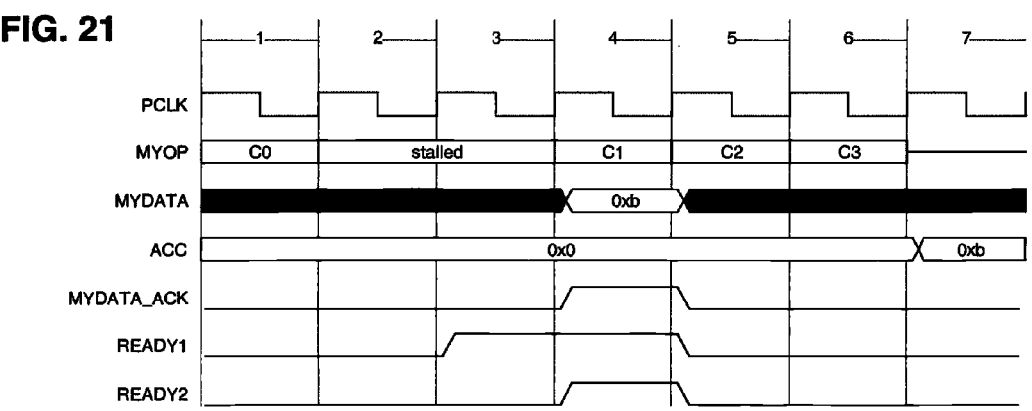

The timing diagram in FIG. 21 shows an example with the signals READY1 and READY2, which control the read of the interface MYDATA. When the instruction MYOP attempts to read the interface MYDATA in cycle 2, the stall condition (READY1 && READY2) is true. This causes the processor pipeline to be stalled from cycles 2 to 3. When the stall condition becomes false, the data is sampled and the ACK signal is asserted.

Figure 22:
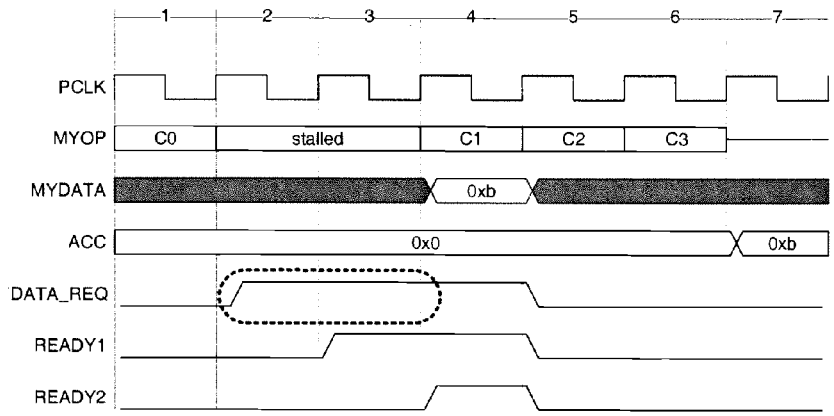

If the handshake protocol specified was REQ and not ACK, the timing diagram would look like FIG. 22. FIG. 22 shows that when the instruction MYOP is in cycle 2, there is an attempt to read the interface MYDATA, and thus the signal MYDATA_POP is asserted. During the period that the processor stalls, this signal remains asserted. In cycle 4, the stall condition is false and the REQ is high, and this is considered to be a valid read, i.e. the read has succeeded. The processor thus de-asserts the REQ signal in the following cycle.

Input Data Interface Example 4

Testing the Status of Data Interfaces

When the processor waits to read or write data from an external agent by means of the stall mechanism described in the previous section, automatic synchronization is achieved between the producer and consumer of the data. This is desirable in many scenarios, especially in multi-processor systems where the processors are communicating data through FIFOs, because it avoids having to design a more complex synchronization protocol. If the consumer processor is running ahead, then it will have to wait for data, since the queue it is reading from will be empty. The steady-state performance should not behave this way, but when it does, there is no special synchronization that needs to happen. However, in some applications, processor stall may not be desirable. The following provides some examples of how to design a processor in accordance with the invention such that reads and writes do not stall the processor pipeline.

One alternative to defining a stall condition would be to always test if data is available before the instruction to read the data is issued. This requires an instruction to evaluate the indicators that can accurately indicate if a read or write attempt from or to an interface will succeed. In one example of the invention, such a data ready indicator is automatically created for each data interface. Note that neither the external ready indicators or the stall condition is sufficient for this purpose. The state of the speculative buffer for the user defined interface must be taken into account. If the speculative buffer has entries, even if the external data source is not ready, the read will not stall. In this example of the invention, the data ready indicator signal automatically generated is called <interface_name>_NOTREADY, and is implemented as the following:

<interface>_NOTREADY=<interface>_spec_buffer_empty
    && <interface>_stall_condition For the interface described in the example in connection with FIG. 20 above, the signal will be <MYDATA>_NOTREADY=<MYDATA>_spec_
    buffer_empty && READY1 && READY2

This signal can be read in any instruction. For example, the following code describes such an instruction, and how it might be used to branch around the instruction that would otherwise stall. The instruction CHECKRDY will read the status of the interface MYDATA and write it into a one-bit Boolean register file in the processor. The code sequence below shows that the read is skipped if there is no data to read.

operation CHECKRDY {out BR b} {in MYDATA_N-
    OTREADY} {assign b=~MYDATA_NOTREADY;
  }
  checkrdy b0
    beqz b0, SKIP
    myop a0
  SKIP: nop CHECKRDY is a user defined instruction that reads the automatically generated interface MYDATA_NOTREADY and inverts it and writes it to a register of Boolean type, b. Therefore, the Boolean register being true indicates that there is data to read from the interface MYDATA, and being false indicates that there is no data and an attempt to read the interface MYDATA will cause a stall. The assembly code shows that the checkrdy instruction writes the register b0, and execute a branch conditional instruction BEQZ, which will take the branch if b0 is equal to zero. If b0 is 1, then the instruction MYOP is executed which reads data from interface MYOP. If b0 is 0, then the branch is taken, skipping the read instruction.

Input Data Interface Example 5

Conditional Read of Data Interfaces

There are situations where the program flow requires that an instruction read or write an interface based on certain condition(s), which may be related to the status of the external agent, internal state of the processor, or both. For example, if the data read from an interface is a vector of data that the processor computes on, it may want to read the next data when it is computing on the last scalar in the vector, or for an output interface, write the data after the last computation is complete. Typically, this would be done by a test and branch program flow, similar to the one shown in the previous example. However, test and branch has an overhead, which may not be desirable in a critical section of the program. In an example of this invention, a mechanism is provided whereby the read or write can be conditionally performed in an instruction, thus making the test and branch unnecessary. Specifically, the read and write from the interface can be killed by determining the value of a signal in the semantics or datapath of the instruction that reads or writes the interface. An automatically generated signal called <interface_name>_kill is made available as an output of the instruction datapath and used by associated gating circuitry in the interface to determine whether access of the interface requested by the instruction should actually occur. This signal can be statically assigned to a value in the datapath or dynamically assigned based on a processor state or any other condition that the user selects. Consider the following instruction that reads the interface MYDATA introduced in previous examples conditionally.

```
state DATA 32 // internal scratch pad state that holds data from MYDATA
state NEXTREAD 1 // true indicates next data should be read
operation MYDATA_ACC {inout AR acc} {inout DATA, inout NEXTREAD, in MYDATA} {
// The first time we operate on new DATA, NEXTREAD is
    0 and the operation
// performed is DATA[7:0]*DATA[23:16], and NEXTREAD is set to 1.
// The second time the operation performed is DATA[15: 8]*DATA[31:24]
// The next data is read and NEXTREAD set to 0.
    wire [7:0] op1=(NEXTREAD)?DATA[23:16]:DATA[7:0];
    wire [7:0]op2=(NEXTREAD)?DATA[31:24]:DATA[15:8];
    wire [15:0] res=op1*op2;
    assign acc=acc+res;
//Read the next data if NEXTREAD is 1
    assign MYDATA_kill=~NEXTREAD;
//update states based on whether new data was read or not
    wire [31:0] next_data=(NEXTREAD)?MYDATA:DATA;
    wire next_read=~NEXTREAD;
    assign DATA=next_data;
    assign NEXTREAD=next_read;
}
operation MYDATA_READ { } {in MYDATA, out DATA, out NEXTREAD } {
    assign DATA=MYDATA;
    assign NEXTREAD=1'b0
}
```

In this instruction, the 32 bit data read from the interface MYDATA consists of 4 scalar values of 8 bits each. The instruction does a multiply and accumulate operation with 2 scalars, therefore requiring a new read every second time. The read from interface MYDATA is killed when new data is not needed by the computation. Note that when the read is killed, the signal value of MYDATA is undefined. The instruction datapath should ensure that this undefined value is not propagated to any result of the instruction. Accordingly, value of the state DATA is modified only when new data is read from the interface. Another operation MYDATA_READ simply reads the interface and writes the value to the state DATA. Using such a scheme, a program can have an efficient loop such as the following:

```
unsigned int accum=0;
MYDATA_READ( ); // first simple read
for(i=0; i<n; i++) {
MYDATA_ACC (accum);
}
```

In this case, there is one simple read from the interface before the loop. All subsequent reads will be automatically done every second time the instruction MYDATA_ACC executes.

Input Data Interface Example 6

Non Blocking Read of Data Interfaces

Based on the two previous examples, it is possible to conditionally read or write an interface if the external agent is ready. This provides a way to design a single instruction that can test the condition and read or write without doing a test and branch as in Example 4. Consider the following read operation.

```
state data_vald 1 // one bit state indicating if read was valid
state DATA 32 // 32 bit state that holds data read from MYDATA
operation MYDATA_READ { } {out data_valid, inout DATA, in MYDATA, in MYDATA_NOTREADY}
{
    assign MYDATA_kill=MYDATA_NOTREADY; //kill read if no data
    wire newdata=~MYDATA_NOTREADY;
    assign DATA=(newdata) ?MYDATA:DATA;
    assign data_valid=newdata;
}
```

When this instruction executes and there is no data to read, the signal MYDATA_NOTREADY is high. By assigning the signal MYDATA_kill to MYDATA_NOTREADY, the read transaction is killed when there is no data to read. This is important because if the read transaction was not killed, then the condition of MYDATA_NOTREADY being true would cause the instruction to not succeed, either by the pipeline being stalled or any other means. This alternative allows the instruction to perform a non-blocking read. However, the instruction datapath should set a status to indicate that no valid data was read, which is done in this example by setting the data_valid state to 0 if the read is killed. Subsequent instructions that operate on the data read from this interface can therefore check if valid data was read.

Input Data Interface Example 7

Prefetching Data from Input Data Interfaces

Figure 23:
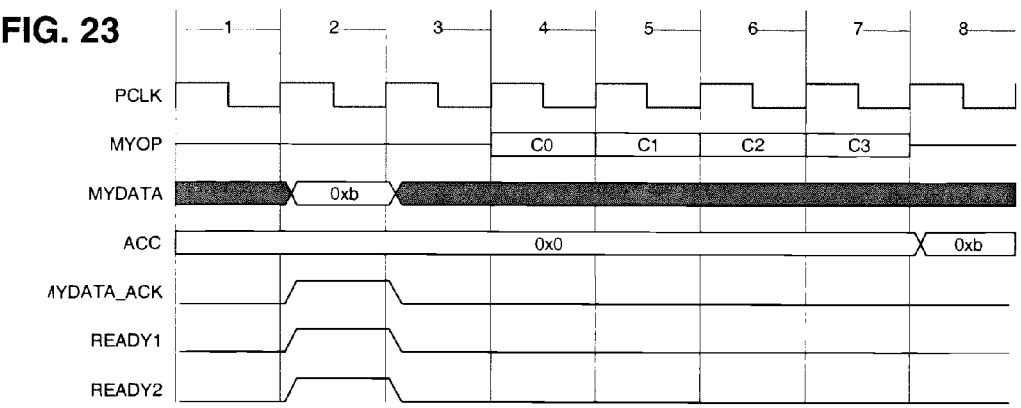

In order to shield the processor from delays caused by interfaces that are often not ready, it may be advantageous to prefetch data from input data interfaces. There is little difference from the point of view of the instruction pipeline between reading data that was speculatively buffered due to a killed instruction, and reading data that was speculatively prefetched. Prefetching data requires at least one speculative buffer entry, whether the read is before or after the commit stage. The upper bound on the number of buffer entries is more flexible for prefetching than it is for covering speculative instruction execution; and the number of entries can be tuned to the data source's bandwidth. Consider the example described in connection with FIG. 20 above, altered to have prefetch:
   interface MYDATA 32 in 1 data noreg prefetch ack {!(READY1 && READY2)}
The timing diagram in FIG. 23 shows an example of performing this prefetching. In cycle 2, data is prefetched even though there is no instruction in the pipeline at that time that would like to use the data.

Designing when the prefetch actually occurs is quite flexible and can be based on the number of free buffer entries or some processor state or control. A variation of the example can use a state MYDATA_ENABLE in the stall condition so that the prefetch is not successful until the processor sets the enable state to 1.
   state MYDATA_ENABLE 1
   interface MYDATA 32 in 1 data noreg prefetch ack {!(READY1 && READY2) && !MYDATA_ENABLE}
   operation MYDATA_CONTROL {in immediate val} {out MYDATA_ENABLE}
   {assign MYDATA_ENABLE=val;}
The following sections describe different types of output data interfaces that can be described using the extension language and compiler according to the above preferred embodiment of the present invention.

In this embodiment, output data interfaces are written with the results of computation performed by instructions. The data interfaces in this embodiment are always generated with an associated handshake signal that indicates to the external logic that data is being written. Output data interfaces themselves can never be written speculatively. This means that if an instruction produces the data to be written to an output data interface before it reaches the commit stage, this data is pipelined inside the processor and presented to the external interface only when the instruction commits.

When an interface is written after the commit point, there is no speculation involved in the interface. The data from the computation unit can be written directly to the external port. There are different variations of non-speculative writes.

Output Data Interface Example 1

Non-Speculative Write, not Registered, No Stall

The simplest form of output interfaces is one where it is written by an instruction at or after the commit stage, and the data is written directly from the computation unit to the processor interface without any registering. An example is shown in the code below. DATA OUT interface is written in cycle c4 (which is the commit stage), is not registered, has a handshaking signal VALID and no stall condition.
   interface DATAOUT 32 out 4 data noreg valid { }
   operation WRITEDATA {in AR regop} {in DATAIN, out DATAOUT}
   {assign DATAOUT=regop+DATAIN;}
In the above case, the data is written to the external logic directly when the instruction WRITEDATA is in c4, which is after the instruction commits. So the data is written to the external interface only if the instruction commits. The VALID signal is automatically asserted in the cycle that the data is written. The data is not registered inside the processor.

Output Data Interface Example 2

Non-Speculative Write, not Registered, with Stall

If the interface DATAOUT has a stall condition as shown in the syntax below, then if the stall condition is true or high, the instruction WRITEDATA will not complete its write until the stall condition is deasserted.
interface DATAOUT 32 out 4 data noreg valid {DATAOUT_NOTREADY}
The implementation of the stall condition is processor architecture dependent, and many mechanisms are available. Several options are outlined below.

Figure 24:
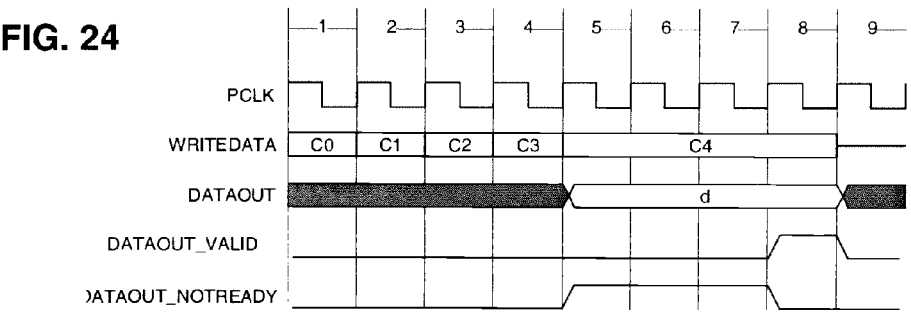

FIG. 24 shows the timing of a case where the instruction waits in the stage that is specified in the interface declaration until the stall condition is resolved. An important design consideration would be the fact that this instruction's stall cannot be interrupted by an external interrupt, because the instruction has passed its commit point. In some architectures this prevents subsequent instructions from also being interruptable.

Figure 25:
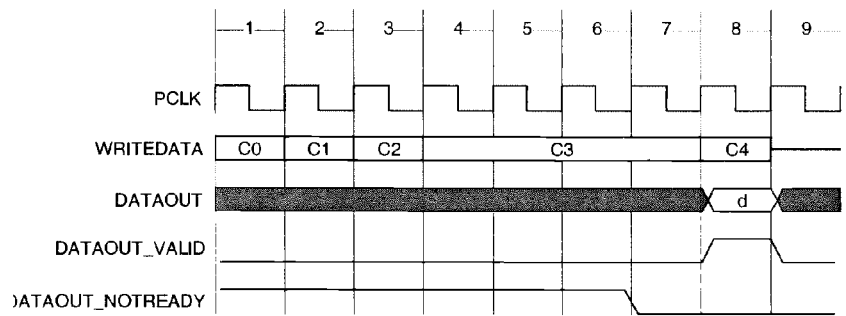

FIG. 25 shows the timing of a case where the instruction is stalled prior to the commit stage until the stall condition is resolved. This approach can be used if interruptability or debuggability of the stalled instruction is important. This mechanism works if the following relationship is assumed between the valid and Stall signals: the stall condition can only transition from deasserted to asserted based on a valid write from the output data interface.

Figure 26:
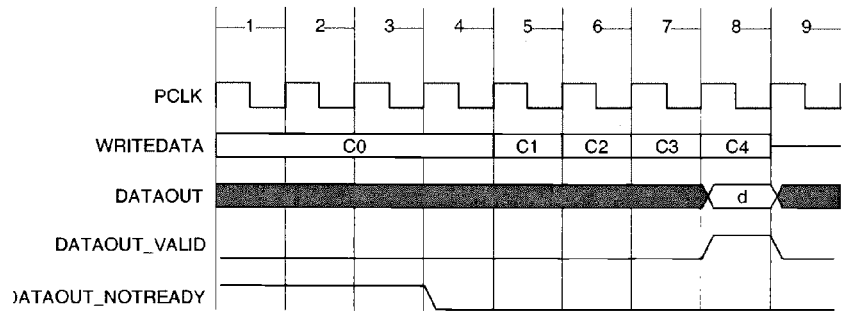

FIG. 26 shows the use of a dispatch stall to resolve the stall condition. The instruction remains in the dispatch stage until the stall condition is resolved. It again requires the restriction that the stall condition can only transition from deasserted to asserted based on a valid write from the output data interface.

Figure 27:
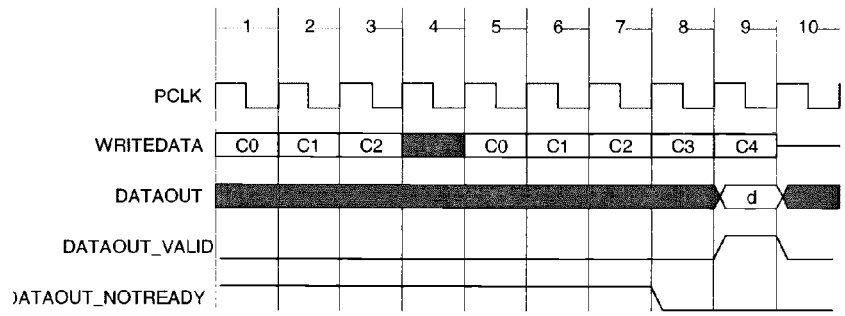

FIG. 27 shows the use of replays to implement the stall condition. The instruction replays each time it reaches the commit stage if the stall condition is true. It again requires the restriction that the stall condition can only transition from deasserted to asserted based on a valid write from the output data interface.

Figure 28:
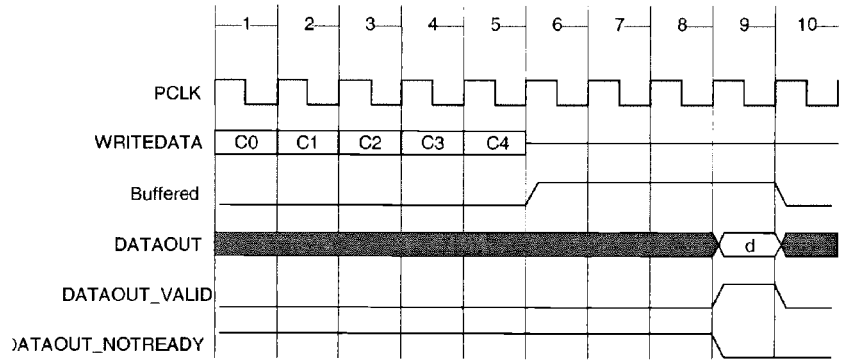

FIG. 28 shows the effect of the use of buffering which moves the output data interface from the instruction pipeline into a separate buffer, analogous to a processor writebuffer. The writebuffer continues to arbitrate for the interface, thereby freeing or buffering the pipeline from the stall condition.

Output Data Interface Example 3

Non-Speculative Write, Registered, No Stall

Another important design consideration is the timing of the unregistered data output interfaces. The processor shares a cycle with the external logic, and if the external logic adds more combinational logic without registering the data first, there may be a timing contention. Thus it is safer to have the output be registered inside the processor. This is shown in the syntax below:

interface DATAOUT 32 out 3 data reg valid { }

In this case, the external port changes its value in the cycle after the data is written from the computation unit. So the external port will be written when the instruction WRITEDATA is in cycle 4 (c4).

Output Data Interface Example 4

Non-Speculative Write, Registered, with Stall

The syntax of this type of interface is shown below.

interface DATAOUT 32 out 3 data reg valid {DATAOUT_NOTREADY}

The instruction writes its output into a register in cycle c3, and the data is ready to be written to the external port in the following cycle. However, if the stall condition is high, i.e. the external agent is not ready, the data needs to remain in the buffer until it can be written. This is significantly different from the unregistered output interface, where the pipeline stall causes the instruction to not produce its output until it can be written to the external port. Here, the external stall condition does not cause a pipeline stall directly. The instruction that writes the data can complete and write its data to the output register, which is no longer a simple flop. The block diagram of the output buffer in this example is shown in FIG. 29.

The output buffer in this example is also designed as a FIFO, which in this case, has one entry. Data is pushed into the FIFO when the instruction writes its output and the buffer is not full. Data is popped out of the FIFO if it has a valid entry and the external logic is ready. The FIFO has a control output that indicates that it is full. When an instruction that writes to the output interface is ready to write the data, it will stall if the buffer is full. This is shown in the pipeline timing diagram in FIG. 30.

Note that in the above design, the instruction will stall in cycle c3 if the output buffer already has an entry that is waiting to be written. However, since this instruction has already committed, it cannot be interrupted. This may not be desirable for debugging a deadlocked system where one would want to interrupt the processor that is waiting to examine the status before resetting the processor. Thus there is a need in some designs to produce the data earlier in the pipeline, before the commit stage, and increase the depth of the buffer to hold more than one entry. This is discussed in the following section.

Output Data Interface Example 5

Speculative Writes to Data Interfaces

The write to a data interface can be speculative inside the processor, but it does not leave the processor until the instruction writing it has committed. In that sense, it is always registered. The registering is achieved with a speculative FIFO as discussed above in connection with FIG. 13. Consider the example above altered to make the data being written in stage 2, which is before the instruction commits.

interface DATAOUT 32 ext out 2 data reg valid {DATAOUT_NOTREADY}

The timing diagram in FIG. 31 shows that even though the instruction MYOP produces the data in cycle 3, the earliest cycle that the data is written to the output port is cycle 5, after the instruction has committed Further aspects and advantages of designing a processor with the example input and output user-defined interfaces according to the invention will now be described.

Figure 34:
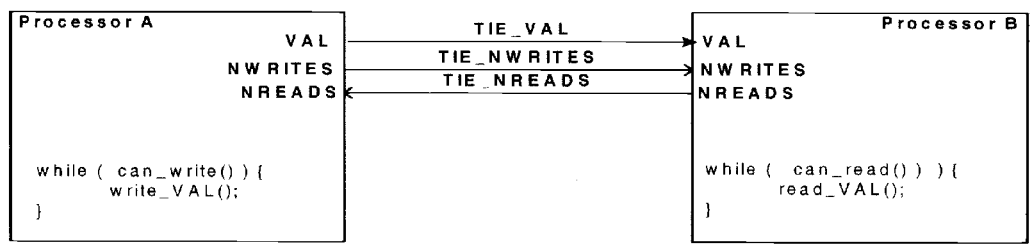
FIG. 34 is a block diagram illustrating how user-defined control interfaces can be used for inter-processor data transfer according to the invention.

The following example shows how control type interfaces of the present invention can be used to implement a simple scheme to communicate status information between processors that need to share data with each other. Consider the system shown in FIG. 34. Assume that the processor A produces data that is read by Processor B. Processor A needs to know if the last data was read before it writes new data. Processor B needs to know if there is new data to be read. This can be accomplished with a scheme using control type interfaces.

The user-defined extensions defined for each processor are shown below. Processor A has the control output VAL, and a state NWRITES that keeps track of the number of writes to the state VAL. It also has a control input interface NREADS that reads how many values have been read by processor B. The instruction write_VAL reads a data from a register, optionally performs some computation (not shown in the code), and writes the value to the state VAL, and updates the state NWRITES. The instruction can_write compares the value of the state NWRITES to the input NREADS to determine if processor A can write the next data. Processor B has a control input VAL that reads data produced by processor A, and another control input NWRITES. It has a state NREADS that keeps track of how many values has been read, which is also exported. The instruction read_VAL reads a new data, optionally performs some computation on it (not shown in code), and writes the result to a register, and updates the state NREADS. The instruction can_read compares the value of NWRITES and NREADS to determine if processor B can read new data. The example code running on the processors is shown in the respective processor blocks shown in FIG. 34.

| Processor A | Processor B |
|---|---|
| state VAL 32 export | interface VAL 32 in 1 control noreg |
| state NWRITES 4 export | interface NWRITES 4 in 1 control noreg |
| interface NREADS 4 in 1 control noreg | state NREADS 4 export |
| operation write_VAL { in AR a } { out VAL, inout NWRITES } { assign VAL = a;   assign NWRITES = NWRITES + 1; } | operation read_VAL { out AR a } { in VAL, inout NREADS } { assign a = VAL;   assign NREADS = NREADS + 1; } |
| operation can_write { out AR a } { in NWRITES, in NREADS} { assign a = (NWRITES == NREADS);} | operation can_read{ out AR a } { in NREADS, in NWTIES } { assign a = (NWRITES == (NREADS+1)); } |

This example illustrates how to implement very simple communication channels between processors using control type interfaces, which themselves do not have a handshake protocol.

According to another aspect of the invention, multiple interfaces that have a specific functional relationship between them can be grouped together as will now be illustrated in further detail. This aspect of the invention is useful in designing "glueless" interfaces to specific external components such as ROM lookup tables, FIFO structures and the like.

One example syntax of describing such a grouped interface using the extension language in accordance with the present invention is shown below:

lookup <name>{<output width>, <input width>}

Where lookup is a keyword in the extension language and <name>, <output width> and <input width> are parameters supplied by the designer. This definition is equivalent to the two interface declarations below:

interface <name>_out <output_width> out 1 control noreg
    interface <name>_in <input_width> in 2 control noreg with the additional constraint that these two interfaces are related to each other and will be used to perform a table lookup operation from an external device such as a ROM memory. Note that both interfaces are of type control and are not registered. Further the default def stage of the output interface is 1 (E stage) and the default use stage of the input interface is 2 (M stage).

The lookup mechanism can be used to create a glueless interface to an external lookup table and used in an instruction as illustrated below:

```
lookup costbl {5, 40}
operation addcos {out AR a, in AR b} {inout costbl}
{
assign costbl_out=b[4:0];
assign a=costbl_in+b[31:5];
}
```

In this example, the output interface costbl_out is written when the instruction addcos is in the execution (E) stage of the pipeline and the input costbl_in is read one cycle later, when the instruction is in the memory access (M) stage. The external logic needs to respond to the output costbl_out in one cycle, with a valid value on the input costbl_in. In architectures without pipeline stalls, no special circuitry is required to handle the special timing relationship between costbl_out and costbl_in. Thus for such architectures, the lookup table construct is identical to the two interface declarations of costbl_out and costbl_in. But for processors with pipeline stalls, additional circuitry is needed for correct operation as will be illustrated now.

Figure 35:
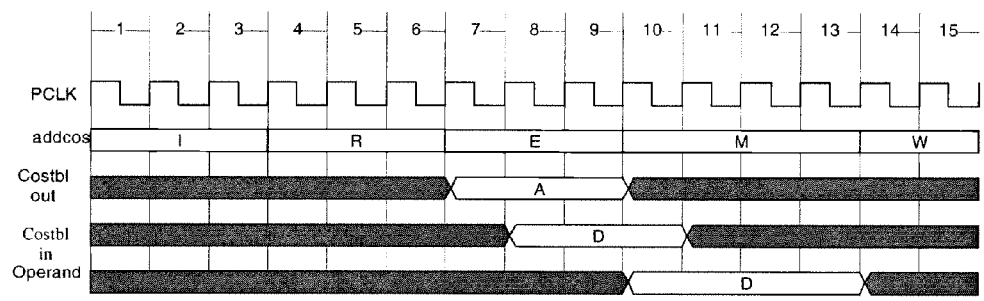
FIG. 35 is a timing diagram illustrating how user-defined control interfaces can be used for data transfer according to the invention.

Consider the timing diagram of FIG. 35, which shows the addcos instruction flowing down the processor pipeline. The pipeline stalls at various points in time, for reasons unrelated to the execution of the addcos instruction. The addcos instruction is in the E stage of the processor pipeline in cycles 7, 8 and 9 because of a pipeline stall. Thus the output costbl_out is driven with the value "A" in each of these clock cycles. In response to this value "A" on costbl_out, the external logic drives the value "D" on the interface costbl_in in cycles 8, 9 and 10. In cycle 10, the instruction addcos moves to the M stage, but is stalled again until cycle 13. Cycle 13 is when the instruction addcos reads its operand from the interface and performs the computation. But in cycle 13, the external logic is no longer driving a valid value on the input interface costbl_in. If the interface is sampled in cycle 13 and the value given as an operand to the instruction addcos, the incorrect input will be used. Therefore, additional circuitry is required inside the processor to latch the data driven by the external logic in cycle 10, and to hold it until it is consumed in cycle 13.

A buffer can be used to hold the value of the interface costbl_in, and in this example the buffer has a single entry. The value on the input interface costbl_in is written to the buffer one cycle after the output costbl_out is written. The buffer is read in the cycle when the instruction is in the stage when it reads the operand costbl_in and there is no pipeline stall. If there is no pipeline stall in the cycle when the buffer is written, then the buffer is bypassed, i.e. the value of costbl_in is a direct input to the datapth or computation unit.

In connection with the lookup mechanism described above, the extension language and compiler of the invention further provide the ability to optionally specify a processor pipeline stage at which the output interface is written and the input interface is used. One example syntax of describing these parameters in accordance with this embodiment of the invention is shown below:

lookup <name>{<output width>, <input width>}
    [{<def stage>, <use stage>}]

Where <def stage> is the pipeline stage in which the output is written and <use stage> is the pipeline stage in which the input is used. These parameter are optional, and if not specified, the default <def stage> is 1 (E stage) and the default <use stage> is 2 (M stage). When these optional parameter are specified, the above construct is equivalent to:

interface <name>_out <output_width> out <def stage> control noreg
    interface <name>_in <input_width> in <use stage> control noreg with the additional constraint that these interfaces are functionally related to each other as described above. The timing diagram of FIG. 35 illustrated the need for a single entry buffer for this mechanism to work in architectures with pipeline stalls. In general, the number of buffer entries needed is equal to the difference between the <use stage> and the <def stage> of the lookup construct.

As discussed above, a processor designed in accordance with the invention can be embodied by various components including as a core in an ASIC. Another useful application is as a processor in a system on a chip (SOC), along with other processors and/or logic. In this regard, one of the most common methods of data transfer in SOC designs, especially ones using multiple processors, is to use data buffers that are essentially FIFO's for inter-processor communications. In traditional multi processor systems, these data buffers are usually implemented as shared memory, and both processors spend many overhead cycles in reading and writing data using load and store instructions that access a system bus. A synchronization mechanism, typically using semaphores, must also be implemented in software to access the pointers to the shared buffer.

The present invention can improve designs for these kinds of systems by allowing customized interfaces in the processor and a standard FIFO in hardware. No bus access is required for data transfer, thus making it possible to do high bandwidth data transfer. Also, synchronization is also automatically done in hardware. This section describes an example of how the present invention can be used to define a set of custom interfaces that will read or write data from a FIFO, based on a standard FIFO design that has control outputs Empty and Full, and control inputs Push and Pop.

The following is an extension language description of an interface to read or write data from/to an external FIFO or queue:

queue <name><width><dir> where queue is an extension language keyword and <name><width> and <dir> are parameters supplied by the designer. The <width> parameter specifies the data width of the FIFO interface and the <dir> parameter specifies whether the interface attaches to an input (in) FIFO or an output (out) FIFO.

An example definition of an input FIFO interface using the above syntax would be:

queue IQ 64 in where IQ is the name of the interface which interfaces to a 64-bit wide input FIFO. This definition is equivalent to the two interface declarations shown below:

interface IQ_Empty 1 in 1 control
interface IQ 64 in 1 data ack sync {IQ_Empty}

The 1-bit control interface "IQ_Empty" is the control input that indicates that the FIFO is empty. The 64 bit data interface "IQ" is the data read from the interface. The interface "IQ" will automatically generate a control output "IQ_ACK", which will be asserted when data is popped from the queue, and this should be connected to the Pop input of the FIFO. The stall condition for the interface "IQ" is defined as the control input 'IQ_Empty". Therefore, when "IQ_Empty" is high, i.e. the FIFO has no data, and the processor attempts to read the FIFO, it will stall and wait until there is data in the FIFO and "IQ_Empty" becomes low. Notice that the interface "IQ" is defined to be read in the E stage (stage 1). This indicates that the read is speculative. However, the speculation will be handled automatically in the processor so that the external FIFO need not be aware of it. If the data has been popped by the processor, it will not be lost if the instruction requesting it does not commit in the pipeline. It will remain in the internal speculative buffer.

An example definition of an output FIFO would be:

queue OQ 64 out where OQ is the name of the interface which interfaces to a 64-bit wide output FIFO. This definition is equivalent to the two interface declarations shown below:

interface OQ_Full 1 in 3 control
interface OQ 64 in 3 data valid {OQ_Full}

The one-bit control interface "OQ_Full" is the control input that indicates that the FIFO is full. The 64-bit data interface "OQ" is the data written to the interface. The interface "OQ" will automatically generate a control output "OQ_Valid", which will be asserted when data is pushed to the queue, and this should be connected to the Push input of the FIFO. The stall condition for the interface "OQ" is defined as the control input 'OQ_Full". Therefore, when "OQ_Full" is high, i.e. the FIFO cannot receive new data, and the processor attempts to write the FIFO, it will stall and wait until there is room in the FIFO and "OQ_Full" becomes low. Note that in this example, the data output is not speculative, it is written in the commit or writeback stage (stage 3).

FIG. 32 shows a processor (A), which produces data as a result of some computation, and writes it to the FIFO interface OQ. The consumer processor (B) reads data from the FIFO through the interface IQ and performs computation on it. There is no expensive load/store operation involved, and no synchronization in software is necessary. If the processor A produces data at a faster rate than processor B can consume, then it will automatically be synchronized due to the stall caused by the FIFO being full. Similarly, if the processor B consumes data faster than processor A can produce data, it will stall due to the FIFO being Empty.

According to a further embodiment of the present invention, system 100 illustrated in FIG. 1, particularly processor generator 102, is further adapted to automatically generate a customized software tools for the customized processor, as described in U.S. Pat. Nos. 6,477,684 and 6,477,697, for example, and further modified in accordance with the present invention. The customized software tools according to one example of this embodiment of the invention include a compiler, assembler, debugger, and instruction set simulator which recognize the new user extension and in particular the user defined interfaces. In particular, the compiler is generated with new abilities to take into account the external interfaces and the effect of the program visible to the system outside the processor due to these interfaces. As will be described in more detail below, the software tools of the invention are aware if any user-defined interface read or write will have a side-effect, and also any resource constraints due to buffering in the processor for example.

The software view of the external interfaces is defined in a data structure as follows:

typedef struct interface_struct {
const char*name;
int num_bits;
uint32 flags;
char dir;
int8 stage;
int8 issue_rate;
}

In the data structure, the members "name", "bits", "dir" and "stage" are directly translated from the interface definition and describe the name, width, direction and read/write stage in instructions respectively. The member "flag" indicates some properties of the interface such as the read or write having a side effect and is derived from the type of the interface, as will be described more fully below. The issue rate defines how often the processor can issue an instruction that has an access to this interface, without causing a hardware interlock, as also described more fully below.

If a speculative FIFO described in connection with FIGS. 12 and 13 is included in the processor, the software tools generated for the processor will include entries as follows:

static interface_t interfaces[ ]={
{"IQ_Empty", 1, 0, 'i', 1, 1},
{"IQ_NOTRDY", 1, 0, 'i', 1, 1},
{"IQ", 32, USERDEFINED_INTERFACE_HAS_SIDE_EFFECT, 'i', 1, 1},
};

The first entry describes the control input IQ_Empty, which is 1 bit, has no side-effect (flag=0), is an input, read in stage 1 (E), and can be read every cycle. Note that the automatically generated interface "IQ_NOTRDY" is also in this list, since user-defined instructions can read this interface (see discussion in connection with FIG. 12). This is similar to the external signal IQ_Empty. The data interface "IQ" is 32-bits, has side effect (i.e. is of type data), is read in stage 1, and can also be read every cycle, since it has a deep enough speculative buffer. Note that the handshake signal IQ_ACK does not appear in this list. This is because the handshake signal is not written by any instruction, it is automatically generated by the hardware whenever the interface is read.

One software consideration noted above involves issue rate due to buffer resource. The interfaces are read and written in a fixed pipeline stage of the processor in the present invention. All instructions reading or writing the interfaces will do so in the same pipeline stage. This allows a processor designer to issue an instruction per cycle without causing resource interlocks. However, there are other design parameters that may cause interlock in hardware. In this example of the invention, therefore, the interface representation used by software tools has a member called issue rate. For control type interfaces, this is always 1, indicating that an access to the interface can be issued every cycle without causing hardware interlock. In the case of an input data interface whose read is speculative, i.e. the read stage is less than the commit stage of the processor, the issue rate will depend on the depth of the speculative buffer. When the speculative buffer for an input data interface has number of entries less than (commit stage−read stage), back to back operations issued per cycle will cause hardware interlock, shown in FIG. 18. In the particular case shown, the read stage is E, but the speculative buffer has only 1 entry. Therefore, an access to this interface can be issued every 2 cycles so as to not cause a hardware interlock, and the issue rate is 2. The compiler is made aware of this resource issue so that when compiling an application that reads an interface with this constraint, it will try to generate a schedule that does not cause these interlocks, if possible. Similarly, for an output data interface that is registered, the issue rate will depend on the output buffer depth.

Read/write properties are another important software consideration when the processor can have VLIW instructions that can contain more than one operation in a single instruction. In this case, an instruction can have multiple operations that read or write the same interface. To generate VLIW instructions from multiple operations, the compiler can bundle accesses to interfaces only when they don't have any side effect. This is specified in the "flag" member of the interface specification. This flag is generated based on the following set of rules:

Input interfaces of type control, whose reads don't have any side effect, can be read by multiple operations within an instruction. All the operations operate on the same value.

Input interfaces of type data, whose reads have side effect, cannot be read by multiple operations within an instruction. This is to allow each operation in the program should operate on a new data read from the external source.

Output interfaces of type data and control, cannot be written by multiple operations within the same instruction. All output interfaces are therefore considered to have a side effect.

Another important software issue is ordering of interface access. The compiler for the Xtensa processor, for example, has the freedom of moving instructions for optimizations while preserving the program flow. Since dependencies between interfaces external to the processor are unknown, accesses to the interfaces may also be reordered, which has the potential of violating the system requirement in some cases. According to a preferred embodiment of the invention, therefore, an option is provided to indicate to the compiler than external interface accesses (both read and write) cannot be reordered with respect to each other. When the compiler is run with the option --mno-reorder-tieport the order of all the reads and writes to the external interfaces will be preserved. When a program is compiled with this flag, the strict ordering rule will apply to the full program. If it is desirable to apply the rule to a specific section of the code, this can be done by adding a pragma as shown below.

```
#pragma _no-reorder-tieport_ (check syntax??)
while (condition) {
write_to_output_A( );
read_from_input_B( );
}
#pragma _reorder-tie-port_
```

In this case, the access to output A and read from input B will not be reordered, but in the rest of the program, external interface accesses can be reordered with respect to each other.

Yet another software issue concerns specifying dependencies between interfaces. Some interfaces may be related such that accessing one interface has side effects on a set of related interfaces. According to an aspect of the invention, therefore, the software tools generated are automatically made aware of the dependencies or relationship between the different interfaces, as derived from the interface description, or specified by the user. The interfaces are partitioned into equivalence classes of related interfaces, and each class is assigned a unique identifier number. To check if two interfaces are related, the interface names can be compared. If an interface is not related to any other interface, its class id is undefined. Note that, in this example, an interface can belong to only one class. The compiler preferably preserves program order of accesses to interfaces with the same class id and does not reorder them. Also, the accesses to interfaces in the same class cannot be bundled into a VLIW instruction. These rules are followed by the compiler and enforced by the scheduler in the assembler.

```
/*This function returns the class identifier for an interface,
or XTENSA_UNDEFINED
  These identifiers can be compared to determine if two
  interfaces are related; the specific values of the identifiers
     have
  no particular meaning otherwise. */
extern int
xtensa_interface_class_id (xtensa_isa isa, xtensa_interface intf);
```

Some dependencies between interfaces can be automatically derived from the interface description. Considering the example of a FIFO interface described earlier, it is clear that the control input interface "IQ_Empty" and the data interface "IQ" are related. This is shown in the code generated for the example.

```
typedef struct intf_class_struct {
int num_members;
const char**members;
} intf_class_t;
static const char*IQ_members[ ]={
"IQ",
"IQ_Empty",
"IQ_NOTRDY"};
static intf_class_t IQ_intf_class={3, &IQ_members};
```

There is an interface class for "IQ". It has three members, the data interface itself, the control interface in the stall condition, "IQ_Empty" and the automatically generated interface "IQ_NOTRDY". All control interfaces in a stall expression will automatically belong to the same group as the data interface, as well as the internal interface for the data ready indicator.

Some relationship between interfaces cannot be derived. The extension language preferably provides a way to express interface classes. One example syntax is as shown below.

property interface_class <name> {<name>, <name> [, <name> ] }

The property "interface_class" can have an arbitrary number of interfaces in its list, and it only specifies that these interfaces are related. The nature of the relationship, in terms of timing and other characteristics, is not specified. This is a means of making the software tools, especially the compiler, not to reorder the accesses.

In many scenarios, the order of interface accesses as seen external to the processor may not follow program order, even when the compiler has not reordered the instructions performing these accesses. This is illustrated best with an example. Consider the case where a write to a data output interface is written into an internal buffer, but has not gone out of the processor due to the stall condition being high. A subsequent instruction reads a data interface whose data is available while the output data is still in the internal buffer. Therefore, the external sequence of events sees the read before the write. This will happen regardless of the interfaces being marked as related, since the instructions executing in order does not guarantee that the external events will happen in order. In this case, the external write can happen an arbitrary number of cycles after the instruction writing the interface produces data.

Therefore, a synchronization instruction would be desirable to synchronize the external events when needed. According to an embodiment of the invention, such an instruction, called EXTW, is automatically added in the hardware description of the processor when a user-defined interface is included in the design. This instruction is similar to a memory synchronization or barrier instruction available in the instruction set of most processors. In addition to waiting for memory accesses to finish, EXTW will also cause the processor to wait for all pending writes on the external interfaces to complete. In the following example pseudocode sequence, all the writes prior to the EXTW must leave the processor before any of the instructions following EXTW can proceed.

store to memory
    write to data interface with stall condition
    long latency instruction that writes to control interface after 10 cycles
    EXTW
    read from external data interface
    load from memory In one example of the invention, the C compiler generated and included in the software tools for the customized processor can be run with the following argument:

--mflush-tieport which will result in no reordering of any access to external interfaces, and in addition, automatically insert the synchronization instruction EXTW after every write to an external interface. This will ensure that all external events as seen outside the processor appear in order. Invoking the compiler with this flag will apply the rule to the complete program. The user can also activate this locally in the program with a pragma as shown below. The pragma will create the barrier by introducing an EXTW instruction.

store to memory
    write to data interface with stall condition
    long latency instruction that writes to control interface after 10 cycles
    #pragma _flush-tieport_
    read from external data interface
    load from memory There are many ways of implementing a synchronization primitive such as EXTW. In one example of the present invention, the EXTW instruction itself is held in the R stage with a dispatch stall until all writes have been completed.

The block diagram in FIG. 33 shows one example implementation of EXTW. Each of the external interface blocks for output interfaces has a control output called "active". The external interface block for the output interfaces have a control output "idle" that indicates that there is currently no data waiting in the buffer to be written, or there is no instruction in the pipeline that will write to this interface. All of these signals are negated and OR'ed to generate the signal WaitForIO, which signals to the stall control block that there is a write that is pending. If the decoder decodes an EXTW instruction, and this signal is high, then the EXTW instruction will be held in the R stage until this signal becomes low.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer-implemented method of generating a processor comprising:
    receiving a specification of one or more user-defined interfaces of the processor; and
    generating, by the computer, a hardware description of the processor based on the specification, the hardware description of the processor including the one or more user-defined interfaces, each of which are capable of reading from or writing to an associated external agent, the external agent being external to the processor and not included in the hardware description, wherein the step of generating a hardware description of one of the user-defined interfaces includes generating the hardware description of a latch that maintains data associated with a write using the one user-defined interface and makes it available to the associated external agent until a subsequent write using the one user-defined interface.

2. A computer-implemented method according to claim 1, wherein the hardware description supports reading and writing data from the associated external agent for one of the user-defined interfaces directly to or from an execution unit of the processor, substantially within one processor cycle.

3. A computer-implemented method according to claim 1, wherein the hardware description supports execution of a first instruction that reads or writes data from or to one of the user-defined interfaces as an operand of the first instruction, and also supports execution of a second instruction that reads or writes data from or to memory, registers or states as an operand of the second instruction in substantially the same manner as the first instruction.

4. A computer-implemented method according to claim 1, wherein the specification includes a bit-width of one of the user-defined interfaces.

5. A computer-implemented method according to claim 1, wherein the specification includes a total quantity of the user-defined interfaces.

6. A computer-implemented method according to claim 1, wherein the specification includes a stage in a pipeline of the processor at which data read from one of the user-defined interfaces is available.

7. A computer-implemented method according to claim 1, wherein the specification includes a stage in a pipeline of the processor at which a write to one of the user-defined interfaces is performed.

8. A computer-implemented method according to claim 1, wherein the step of generating a hardware description of one of the user-defined interfaces includes generating a hardware description of a register, such that data is registered in the processor between the execution unit and the external agent.

9. A computer-implemented method according to claim 8, further comprising determining whether to generate the hardware description of the register in accordance with a parameter in the specification.

10. A computer-implemented method according to claim 1, further comprising determining whether to generate the hardware description of the latch in accordance with a parameter in the specification.

11. A computer-implemented method according to claim 1, wherein the step of generating a hardware description of one of the user-defined interfaces includes generating a hardware description of a mechanism for implementing a communication protocol with the external agent associated with the one user-defined interface.

12. A computer-implemented method according to claim 11, wherein the mechanism includes a circuit to output a control signal to the associated external agent in accordance with a status of a read or write operation using the one user-defined interface.

13. A computer-implemented method according to claim 12, further comprising determining whether to generate the hardware description of the circuit in accordance with a parameter in the specification.

14. A computer-implemented method according to claim 12, wherein the control signal comprises an acknowledgment that data associated with a read operation using the one user-defined interface has been received.

15. A computer-implemented method according to claim 12, wherein the control signal comprises a valid signal indicating that data associated with a write operation using the one user-defined interface is valid.

16. A computer-implemented method according to claim 12, wherein the control signal comprises a request for data associated with the read or write operation to be executed by the processor.

17. A computer-implemented method according to claim 11, wherein the mechanism includes a circuit that receives the status of the associated external agent, and generates a signal to an execution unit of the processor indicating whether the external agent is ready when data needs to be read from or written to the one user-defined interface.

18. A computer-implemented method according to claim 17, wherein the signal generated by the circuit indicating that the external agent associated with the one user-defined interface is not ready will stall the processor pipeline.

19. A computer-implemented method according to claim 17, wherein the status of the signal generated by the circuit indicating that the external agent associated with the one user-defined interface is not ready can be read in an instruction of the processor so as to test whether the next access of the interface will succeed.

20. A computer-implemented method according to claim 19, wherein the step of generating the hardware description includes generating a description of a mechanism that facilitates conditional access of the one user-defined interface by the instruction, wherein the signal generated by the circuit indicating that the external agent associated with the one user-defined interface is not ready is used by the mechanism to determine whether access of the one user-defined interface by the instruction should be killed, such that the interface is accessed if the external agent is ready, but not accessed if it is not ready.

21. A computer-implemented method according to claim 1, wherein the step of generating the hardware description includes generating a description of a mechanism that facilitates conditional access of one of the user-defined interfaces, the mechanism determining whether access of the one user-defined interface by an instruction should be killed during execution of that instruction.

22. A computer-implemented method according to claim 17, further comprising determining whether to generate the hardware description of the circuit in accordance with a parameter in the specification.

23. A computer-implemented method according to claim 1, wherein the step of generating the hardware description includes generating a hardware description of a circuit for handling speculative accesses of certain of the user-defined interfaces, such that data read from the certain interfaces is not lost if an instruction does not consume the data, or output data generated by an instruction leaves the processor after the instruction commits.

24. A computer-implemented method according to claim 23, wherein the step of generating the hardware description of the circuit includes automatically generating a buffer whose size is determined by the difference between a first pipeline stage at which a read or write is requested by an instruction executing in the pipeline and a second pipeline stage at which the instruction commits.

25. A computer-implemented method according to claim 23, further comprising automatically generating the hardware description of the circuit in accordance with the specification of the certain user-defined interfaces.

26. A computer-implemented method according to claim 1, wherein the step of generating the hardware description includes:
    generating a hardware description of a prefetch mechanism for prefetching data from the associated external agent of one of the user-defined interfaces before a read of the one user-defined interface is requested.

27. A computer-implemented method according to claim 26, further comprising determining whether to generate the hardware description of the prefetch mechanism in accordance with the specification.

28. A computer-implemented method according to claim 1, wherein the step of generating the hardware description includes:
    generating a hardware description of a prefetch mechanism for prefetching data from the associated external agent of one of the user-defined interfaces before a read of the one user-defined interface is requested;
    generating a hardware description of a circuit for handling speculative reads of certain of the user-defined interfaces, such that data read from the certain interfaces is not lost if an instruction does not consume the data; and
    generating a hardware description of a buffer adapted to store data associated with the prefetch mechanism and the speculative reads.

29. A computer-implemented method according to claim 1, wherein the operation of reading from or writing to the associated external agent is initiated by the associated external agent.

30. A computer-implemented method according to claim 1, wherein the step of generating the hardware description includes generating a hardware description of a circuit that generates a signal having a first logical value when there are any pending memory accesses or a pending write to one of the user defined interfaces, the signal having a second logical value opposite the first logical value otherwise.

31. A computer-implemented method according to claim 30, wherein the generated signal enables implementation of a synchronization instruction such that execution of the synchronization instruction by the processor ensures that the memory accesses and the pending write executed prior to the synchronization instruction are visible to logic external to the processor before any instructions subsequent to the synchronization instruction are executed by the processor.

32. A computer-implemented method according to claim 1, wherein the step of receiving the specification of the user-defined interface includes:
    including one or more parameters of the user-defined interface provided by a designer of the processor in the specification.

33. A computer-implemented method according to claim 32, wherein the parameters include one or more of interface name, interface width and interface direction.

34. A system for generating a description of a processor, comprising:
    a processor extension compiler that receives a specification of a user-defined interface of the processor and generates a hardware description that includes in the instruction set architecture of the processor a read or write operation associated with the user-defined interface, wherein the user-defined interface is associated with an external agent, the external agent being external to the processor and not included in the hardware description, wherein the hardware description includes a latch that maintains data associated with the write operation using the user-defined interface and makes it available to the associated external agent until a subsequent write using the user-defined interface.

35. A system according to claim 34, wherein the hardware description supports reading or writing data to and from the associated external agent directly to and from an execution unit of the processor in substantially one processor cycle.

36. A system according to claim 34, wherein the hardware description supports execution of a first instruction that can read or write data from or to the user-defined interface as an operand of the first instruction, and supports execution of a second instruction that can read or write data to and from memory, registers or states as an operand of the second instruction in substantially the same manner as the first instruction.

37. A system according to claim 34, wherein the processor extension compiler generates the hardware description such that data from the read operation using the user-defined interface is available at a configurable stage in a pipeline of the processor based on the specification.

38. A system according to claim 34, wherein the processor extension compiler generates the hardware description such that the write operation using the user-defined interface is performed using data from a configurable stage in a pipeline of the processor based on the specification.

39. A system according to claim 34, wherein the hardware description includes a register for the user-defined interface, such that the data is registered in the processor between an execution unit of the processor and the external agent.

40. A system according to claim 39, wherein the processor extension compiler optionally includes the register in the hardware description in accordance with the specification.

41. A system according to claim 34, wherein the processor extension compiler optionally includes the latch in the hardware description in accordance with the specification.

42. A system according to claim 34, wherein the hardware description includes a mechanism for implementing a communication protocol with the external agent associated with the user-defined interface.

43. A system according to claim 42, wherein the hardware description for the communication protocol mechanism includes a circuit to output a control signal to the associated external agent in accordance with a status of the read or write operation using the user-defined interface.

44. A system according to claim 43, wherein the processor extension compiler optionally includes the circuit in the hardware description in accordance with the specification.

45. A system according to claim 43, wherein the control signal comprises an acknowledgment that data associated with the read operation using the user-defined interface has been received.

46. A system according to claim 43, wherein the control signal comprises a valid signal indicating that data associated with a write operation using the user-defined interface is valid.

47. A system according to claim 43, wherein the control signal comprises a request to the associated external agent for data associated with the read or write operation to be executed by the processor.

48. A system according to claim 43, wherein the hardware description for the communication protocol mechanism includes a circuit that receives a status of the associated external agent, and generates a signal to an execution unit of the processor that indicates whether the external agent is ready when data needs to be read from or written to the user-defined interface.

49. A system according to claim 48, wherein the signal generated by the circuit when the external agent associated with the user-defined interface is not ready will stall a pipeline of the processor.

50. A system according to claim 48, wherein the status of the signal generated by the circuit indicating that the external agent associated with the user-defined interface is not ready can be read in an instruction of the processor so as to test whether the next access of the interface will succeed,.

51. A system according to claim 50, wherein the hardware description includes a mechanism that facilitates conditional access of the one user-defined interface by the instruction, wherein the signal generated by the circuit indicating that the external agent associated with the user-defined interface is not ready is used by the mechanism to determine whether access of the one user-defined interface by the instruction should be killed, such that the interface is accessed if the external agent is ready, but not accessed if it is not ready.

52. A system according to claim 34, wherein the hardware description includes a mechanism that facilitates conditional access of the user-defined interface, the mechanism determining whether access of the user-defined interface by an instruction should be killed during execution of that instruction.

53. A system according to claim 50, wherein the processor extension compiler determines whether to optionally include the circuit in the hardware description in accordance with the specification.

54. A system according to claim 34, wherein the hardware description includes a circuit for handling speculative access of the user-defined interface, such that data from the interface is not lost if an instruction associated with the read does not consume the data, or output data generated by an instruction associated with the write operation leaves the processor after the instruction commits.

55. A system according to claim 54, wherein the processor extension compiler automatically includes in the hardware description of the circuit a buffer whose size is determined by the difference between a first pipeline stage at which a read or write is requested by an instruction executing in the pipeline and a second pipeline stage at which the instruction commits.

56. A system according to claim 54, wherein the processor extension compiler automatically includes the circuit in the hardware description in accordance with the specification.

57. A system according to claim 34, wherein the hardware description includes:
  a prefetch mechanism for prefetching data from the associated external agent of the user-defined interface before a read of the user-defined interface is requested.

58. A system according to claim 57, wherein the processor extension compiler optionally includes the prefetch mechanism in the hardware description in accordance with the specification.

59. A system according to claim 34, wherein the hardware description includes:
  a prefetch mechanism for prefetching data from the associated external agent of the user-defined interface before a read of the user-defined interface is requested;

a circuit for handling speculative reads of the user-defined interface, such that data from the interface is not lost if an instruction associated with the read does not consume the data;

a buffer for storing data associated with the prefetch mechanism and the speculative reads.

60. A system according to claim 34, wherein the hardware description includes a circuit that generates a signal having a first logical value when there are any pending memory accesses or a pending write to the user defined interface, the signal having a second logical value opposite the first logical value otherwise.

61. A system according to claim 60, wherein the generated signal enables implementation of a synchronization instruction such that execution of the synchronization instruction by the processor ensures that the memory accesses and the pending write executed prior to the synchronization instruction are visible to logic external to the processor before any instructions subsequent to the synchronization instruction are executed by the processor.

62. A system according to claim 34, wherein the read or write operation is initiated by the associated external agent.

63. A system according to claim 34, wherein the processor extension compiler further generates a set of software tools that support the user-defined interface.

64. A system according to claim 63, wherein the processor extension compiler generates an interface description of the user-defined interface that indicates whether access to the associated external agent has a side effect.

65. A system according to claim 63, wherein the processor extension compiler further determines whether multiple accesses to the user-defined interface can be issued in the same instruction, such that the generated software tools can apply any restrictions regarding the multiple accesses in compiled software for the processor.

66. A system according to claim 65, wherein the processor extension compiler generates an interface description of the user-defined interface that indicates the clock cycle rate at which instructions accessing the interface can be issued in a pipeline of the processor.

67. A system according to claim 63, wherein the processor extension compiler generates a description of dependencies between accesses to the user-defined interface and certain other user-defined interfaces.

68. A system according to claim 67, wherein the processor extension compiler further automatically derives ordering restrictions due to the dependencies such that the generated software tools can apply the restrictions in compiled software for the processor.

69. A system according to claim 34, wherein the processor extension further compiler automatically generates support for a synchronization instruction in the hardware description of the processor that synchronizes access to the user-defined interface.

70. A system according to claim 63, wherein the software tools generated by the processor extension compiler automatically inserts a synchronization instruction in compiled software for the processor that synchronizes access to the user-defined interface.

71. A system according to claim 34, wherein system further includes:

a user interface that allows a designer of the processor to include one or more parameters of the user-defined interface in the specification.

72. A system according to claim 71, wherein the parameters include one or more of interface name, interface width and interface direction.

\* \* \* \* \*